(12) United States Patent
Ichikawa

(10) Patent No.: US 8,081,253 B2
(45) Date of Patent: Dec. 20, 2011

(54) ZOOM LENS AND IMAGE PICKUP APPARATUS EQUIPPED WITH SAME

(75) Inventor: Keisuke Ichikawa, Tama (JP)

(73) Assignee: Olympus Imaging Corp., Tokyo (JP)

( * ) Notice: Subject to any disclaimer, the term of this patent is extended or adjusted under 35 U.S.C. 154(b) by 347 days.

(21) Appl. No.: 12/387,711

(22) Filed: May 5, 2009

(65) Prior Publication Data

US 2009/0284642 A1     Nov. 19, 2009

(30) Foreign Application Priority Data

May 15, 2008   (JP) .................. 2008-128692

(51) Int. Cl.
| | |
|---|---|
| G03B 13/00 | (2006.01) |
| G03B 17/00 | (2006.01) |
| H04N 5/232 | (2006.01) |
| G02B 15/14 | (2006.01) |
| G02B 9/08 | (2006.01) |

(52) U.S. Cl. ......... 348/347; 348/240.3; 396/82; 396/85; 359/687; 359/689; 359/695; 359/740; 359/793

(58) Field of Classification Search .................. 348/345, 348/347, 240.99, 240.3; 396/79, 82, 85, 396/89, 529; 359/687, 689, 690, 695, 758, 359/760, 765, 769, 774, 781–783, 740, 754, 359/793

See application file for complete search history.

(56) References Cited

U.S. PATENT DOCUMENTS

| | | | |
|---|---|---|---|
| 6,452,729 B2 | 9/2002 | Yamamoto | |
| 2001/0036020 A1 | 11/2001 | Yamamoto | |
| 2006/0072211 A1* | 4/2006 | Imamura | 359/686 |

FOREIGN PATENT DOCUMENTS

| | | |
|---|---|---|
| JP | 2001-343587 | 12/2001 |
| JP | 2005-338344 | 12/2005 |

* cited by examiner

Primary Examiner — Rochelle-Ann J Blackman
(74) Attorney, Agent, or Firm — Kenyon & Kenyon LLP

(57) ABSTRACT

A zoom lens has a negative object side lens unit (or first lens unit G1), a positive image side lens unit (or third lens unit G3), a positive intermediate lens unit (or second lens unit G2), and an aperture stop. The distance between the object side lens unit and the intermediate lens unit is smaller at the telephoto end than at the wide angle end, the distance between the intermediate lens unit and the image side lens unit is larger at the telephoto end than at the wide angle end, the intermediate lens unit moves in such a way that it is located closer to the object side at the telephoto end than at the wide angle end, the image side lens unit moves in such a way that it is located closer to the image side at the telephoto end than at the wide angle end, the aperture stop moves integrally with the intermediate lens unit. The image side lens unit is composed of two lens component including a front lens component and a positive rear lens component arranged in the mentioned order from the object side. The absolute value of the paraxial radius of curvature of the image side lens surface of the front lens component is smaller than the absolute value of the paraxial radius of curvature of the object side surface of the rear lens component.

18 Claims, 21 Drawing Sheets

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2008-128692 filed on May 15, 2008; the entire contents of which are incorporated herein by reference.

BACKGROUND OF THE INVENTION

1. Field of the Invention

The present invention relates to a zoom lens. The present invention also relates to an image pickup apparatus equipped with a zoom lens.

2. Description of the Related Art

There is a conventionally known small-size zoom lens for use in a digital camera that has three or more lens units including a lens unit having a negative refracting power disposed closest to the object side, a lens unit having a positive refracting power disposed closest to the image side, and an intermediate lens unit having a positive refracting power disposed therebetween, as disclosed in, for example, Japanese Patent Application Laid-Open Nos. 2001-343587 and 2005-338344.

Disposing a lens unit having a negative refracting power closest to the object side in the zoom lens of this type is advantageous in achieving an adequately large angle of field at the wide angle end zoom position and in reducing the size of the zoom lens with respect to the diametrical direction. In addition, disposing a lens unit having a positive refracting power closest to the image side facilitates locating the exit pupil farther from the image plane and reducing color shading.

In this zoom lens, the intermediate lens unit is moved during zooming in such a way that it is located closer to the object side at the telephoto end than at the wide angle end, and the lens unit closest to the image side is moved in such a way that it is located closer to the image side at the telephoto end than at the wide angle end. By moving the lens unit in this way, the magnifying effect is shared by the intermediate lens unit and the lens unit closest to the image side, which is advantageous in achieving an adequate zoom ratio.

In addition, an aperture stop is moved integrally with the intermediate zoom lens, which facilitates a reduction in the size of the intermediate lens unit and simplification of a driving mechanism for zooming.

SUMMARY OF THE INVENTION

A zoom lens according to a first aspect of the present invention comprises:

an object side lens unit having a negative refracting power disposed closest to the object side, an image side lens unit having a positive refracting power disposed closest to the image side, an intermediate lens unit having a positive refracting power disposed between the object side lens unit and the image side lens unit, and an aperture stop disposed closer to the image side than the object side lens unit and closer to the object side than the image side lens unit, wherein the distance between the object side lens unit and the intermediate lens unit is smaller at the telephoto end than at the wide angle end, the distance between the intermediate lens unit and the image side lens unit is larger at the telephoto end than at the wide angle end, the intermediate lens unit moves in such a way that it is located closer to the object side at the telephoto end than at the wide angle end, the image side lens unit moves in such a way that it is located closer to the image side at the telephoto end than at the wide angle end, the aperture stop moves integrally with the intermediate lens unit during zooming from the wide angle end to the telephoto end, and when a lens component is defined as a lens member whose lens surfaces that are in contact with air include only two surfaces, one being an object side lens surface and the other being an image side lens surface, the image side lens unit comprises, in order from the object side, a front lens component having a meniscus shape with a concave object side lens surface and a rear lens component having a positive refracting power and having a meniscus shape with a concave object side lens surface, the total number of lens components included in the image side lens unit is two, and the absolute value of the paraxial radius of curvature of the image side lens surface of the front lens component is smaller than the absolute value of the paraxial radius of curvature of the object side lens surface of the rear lens component.

An image pickup apparatus according to a second aspect of the present invention comprises the above-described zoom lens, and an image pickup element that has an image pickup surface disposed on the image side of the zoom lens and converts an optical image on the image pickup surface formed by the zoom lens into an electrical signal.

DETAILED DESCRIPTION OF THE INVENTION

Figure 1A:
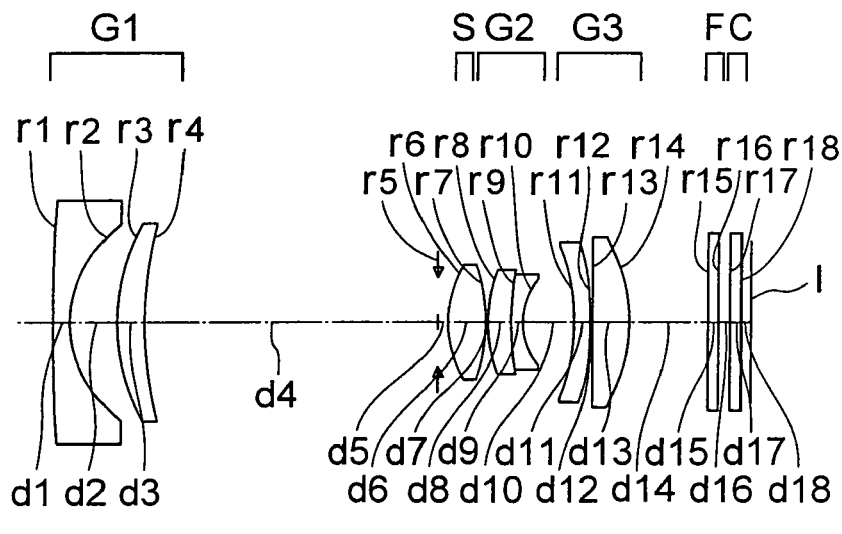
FIGS. 1A, 1B, and 1C are cross sectional views of a zoom lens according to a first embodiment of the present invention in the state in which the zoom lens is focused on a object point at infinity respectively at the wide angle end (FIG. 1A), in an intermediate state (FIG. 1B), and at the telephoto end (FIG. 1C)

In view of the above described object, the zoom lens according to the present invention includes an object side lens unit having a negative refracting power disposed closest to the object side, an image side lens unit having a positive refracting power disposed closest to the image side, an intermediate lens unit having a positive refracting power disposed between the object side lens unit and the image side lens unit, and an aperture stop disposed closer to the image side than the object side lens unit and closer to the object side than the image side lens unit, wherein the distance between the object side lens unit and the intermediate lens unit is smaller at the telephoto end than at the wide angle end, the distance between the intermediate lens unit and the image side lens unit is larger at the telephoto end than at the wide angle end, the intermediate lens unit moves in such a way that it is located closer to the object side at the telephoto end than at the wide angle end, the image side lens unit moves in such a way that it is located closer to the image side at the telephoto end than at the wide angle end, the aperture stop moves integrally with the intermediate lens unit during zooming from the wide angle end to the telephoto end, and when a lens component is defined as a lens member whose lens surfaces that are in contact with air include only two surfaces, one being an object side lens surface and the other being an image side lens surface, the image side lens unit comprises, in order from the object side, a front lens component having a meniscus shape with a concave object side lens surface and a rear lens component having a meniscus shape having a positive refracting power with a concave object side lens surface, the total number of lens components included in the image side lens unit being two, and the absolute value of the paraxial radius of curvature of the image side lens surface of the front lens component is smaller than the absolute value of the paraxial radius of curvature of the object side lens surface of the rear lens component.

As described above, in the zoom lens according to the present invention, the lens unit closest to the object side is a negative lens unit, and the lens unit closest to the image side is a positive lens unit, the intermediate lens unit provided therebetween is a lens unit having a positive refracting power, an aperture stop is disposed at the above described position, and the lens units and the aperture stop are moved in the above-described manner during zooming. The above-described configuration of the zoom lens is advantageous, for example, in achieving a size reduction and a high zoom ratio and in reducing color shading.

On the other hand, the change in the distance between the image side lens unit and the aperture stop becomes larger with an increase in the zoom ratio.

For this reason, in order to reduce the size and cost of the zoom lens while suppressing changes in aberrations that can be caused with an increase in the zoom ratio, it is important to achieve a reduction in variations in aberrations in the image side lens unit during zooming with a small number of lens components.

According to the present invention, the front lens component and the rear lens component having a positive refracting power in the image side lens unit both have a meniscus shape with a concave surface directed toward the object side, and the absolute value of the paraxial radius of curvature of the image side lens surface of the front lens component is smaller than the absolute value of the paraxial radius of curvature of the object side lens surface of the rear lens component.

With this configuration, the angle of incidence of off-axis beams on each lens surface in the image side lens unit can be made small, and the front lens component can have the function of correcting curvature of field. This facilitates correction of aberrations at the wide angle end and a reduction in variations in aberrations during zooming, which is advantageous in increasing the angle of field and the zoom ratio.

It is more preferred that the following conditions be satisfied:

$$-0.45 < f_F/f_{IF} < 0.20 \quad (1)$$

$$-10.0 < (R_{IFR}+R_{IRF})/(R_{IFR}-R_{IRF}) < -1.1 \quad (2)$$

$$-90.0 < D_M/D_f < -3.0 \quad (3)$$

where, $f_{IF}$ is the focal length of the front lens component in the image side lens unit, $f_I$ is the focal length of the image side lens unit, $R_{IFR}$ is the paraxial radius of curvature of the image side lens surface of the front lens component in the image side lens unit, $R_{IRF}$ is the paraxial radius of curvature of the object side lens surface of the rear lens component in the image side lens unit, $D_M$ is the distance between the position of the intermediate lens unit that moves integrally with the aperture stop at the wide angle end and that at the telephoto end, and $D_I$ is the distance between the position of the image side lens unit at the wide angle end and that at the telephoto end, wherein each distance $D_M$, $D_I$ is represented by a positive value if the corresponding lens unit is displaced toward the object side by zooming from the wide angle end to the telephoto end and by a negative value if the corresponding lens unit is displaced toward the image side.

Conditional expression (1) specifies preferred values of the refracting power of the front lens component in the image side lens unit.

Since the front lens component has a surface with a small curvature radius in absolute value, preventing the absolute value of the refracting power of this lens from becoming unduly large facilitates reduction of curvature of field while suppressing aberrations of the front lens component.

If the lower limit of conditional expression (1) is not exceeded so that the front lens component is prevented from having an unduly high negative refracting power, the positive refracting power of the rear lens component can be made relatively small, which facilitates correction of aberrations.

If the upper limit of conditional expression (1) is not exceeded so that the front lens component is prevented from having an unduly high positive refracting power, reduction of aberrations in the front lens component is facilitated.

Conditional expression (2) specifies preferred shapes of the air lens defined between the image side surface of the front lens component and the object side surface of the rear lens component in the image side lens unit.

If the lower limit of conditional expression (2) is not exceeded, the absolute value of the curvature of each lens surface in the image side lens unit can easily be made small. This is advantageous in reducing spherical aberration etc.

If the upper limit of conditional expression (2) is not exceeded, the angle of incidence of beams on the object side lens surface of the rear lens component can easily be made small. This facilitates a reduction in off-axis aberrations at the telephoto end.

Conditional expression (3) specifies preferred values of the ratio of the movement amount of the intermediate lens unit that moves integrally with the aperture stop and that of the image side lens unit.

It is advantageous that the lower limit of conditional expression (3) is not exceeded so that the entire length of the zoom lens at the telephoto end does not becomes unduly large and the image side lens unit provides the magnification change. This facilitates increasing the zoom ratio while reducing variations in aberrations during zooming.

It is advantageous that the upper limit of conditional expression (3) is not exceeded so that the intermediate lens unit provides the magnification change and the movement amount of the image side lens unit is made moderately small. This facilitates reducing variations of aberration in the image side lens unit during zooming.

It is also preferred that the following condition be satisfied:

$$1.0 < (R_{IRF} + R_{IRR})/(R_{IRF} - R_{IRR}) < 3.0 \quad (4)$$

where $R_{IRF}$ is the paraxial radius of curvature of the object side lens surface of the rear lens component in the image side lens unit, and $R_{IRR}$ is the paraxial radius of curvature of the image side lens surface of the rear lens component in the image side lens unit.

Conditional expression (4) specifies preferred shapes of the rear lens component in the image side lens unit.

If the lower limit of conditional expression (4) is not exceeded so that the rear lens component has an appropriate concave surface on its object side, a reduction in variations in aberrations during zooming is facilitated.

If the upper limit of conditional expression (4) is not exceeded, the absolute value of the curvature of the image side lens surface of the rear lens component can easily be made small, which facilitates a reduction in spherical aberration and coma.

It is also preferred that the front lens component in the image side lens unit have a meniscus shape that satisfies the following condition:

$$-1.3 < f_{IFF}/f_{IFR} < -0.5 \quad (5)$$

where $f_{IFF}$ is the reciprocal of the refracting power of the object side lens surface of the front lens component in the image side lens unit, and $f_{IFR}$ is the reciprocal of the refracting power of the image side lens surface of the front lens component in the image side lens unit.

Designing the front lens component in the image side lens unit to have a meniscus shape facilitates correction of negative curvature of field that is likely to occur throughout the entire zoom range. Thus, the amount of correction of curvature of field that the object side lens unit is required to provide can be reduced, and the powers of the respective lens units can easily be optimized. Consequently, aberrations that might be generated with an increase in the angle of field and an increase in the zoom ratio can be suppressed easily.

Conditional expression (5) specifies preferred values of the refracting powers of the lens surfaces for achieving correction of curvature of field.

If the lower limit of conditional expression (5) is not exceeded, curvature of field and astigmatic difference can easily be prevented from becoming unduly large.

If the upper limit of conditional expression (5) is not exceeded, adequate correction of curvature of field is achieved, and the amount of correction of aberrations that the object side lens unit is required to provide can be reduced, which is advantageous in increasing the zoom ratio with an appropriate refracting power arrangement.

It is also preferred that the aperture stop be provided just in front of the intermediate lens unit. This further facilitates a reduction in the size of the object side lens unit. This also facilitates making the angle of incidence of off-axis rays on the image plane smaller.

It is also preferred that the intermediate lens unit be a lens unit disposed just after the image side of the object side lens unit, and the zoom lens satisfy the following condition at the wide angle end:

$$1 < D_{OM}/f_W < 4 \quad (6)$$

where $D_{OM}$ is the distance, on the optical axis, from the lens surface closest to the image side in the object side lens unit to the lens surface closest to the object side in the intermediate lens unit at the wide angle end, and $f_W$ is the focal length of the entire zoom lens system at the wide angle end.

Disposing the intermediate lens unit that moves integrally with the aperture stop during zooming just after the image side of the object side lens unit is advantageous in reducing the size of the zoom lens with respect to the diametrical direction.

Conditional expression (6) specifies preferred values of the distance between the object side lens unit and the intermediate lens unit that are advantageous in achieving an adequate zoom ratio, good optical performance, and size reduction.

Providing an adequate distance between the object side lens unit and the intermediate lens unit so that the lower limit of conditional expression (6) is not exceeded is advantageous in achieving an adequate zoom ratio while making the refracting powers of the respective lens units small. This facilitates a reduction in the amount of aberrations in each lens unit and, therefore, is advantageous in achieving good optical performance throughout the entire zoom range.

If the upper limit of conditional expression (6) is not exceeded, the object side lens unit is prevented from being located unduly away from the aperture stop, which is advantageous in reducing the size of the object side lens unit with respect to the diametrical direction.

It is preferred that all the lens elements in the image side lens unit satisfy the following condition:

$$n_{Iave} \geq 1.4 \quad (7)$$

$$\upsilon_{Iave} \geq 50 \quad (8)$$

where $n_{Iave}$ is the average of the reflective indices of all the lens elements in the image side lens unit, and $\upsilon_{Iave}$ is the average of the Abbe numbers of all the lens elements in the image side lens unit.

Use of materials having high refractive indices that satisfy conditional expression (7) in all the lens elements in the image side lens unit facilitates correction of astigmatism. In addition, use of materials having low dispersions that satisfy conditional expression (8) is advantageous in reducing chromatic aberration.

It is also preferred that the total number of lens elements included in the image side lens unit be two, and either one of these lens units have an aspheric surface. This is advantageous in reducing the size and cost of the image side lens unit. Use of an aspheric surface is advantageous in correcting astigmatism in shooting an object at a very short distance.

In order to achieve good optical performance, it is preferred to use an aspheric surface in one or both surfaces of the rear lens component in the image side lens unit. It is preferred, in particular, that the image side lens surface, which has a high positive refracting power, be designed to be an aspheric surface having a positive refracting power decreasing away from the optical axis.

It is also preferred that the image side lens unit include at least one resin lens element (i.e. a lens element made of a resin). Using at least one resin lens element in the image side lens unit leads to a reduction in the cost and facilitates lens molding.

It is also preferred that the zoom lens satisfy the following condition:

$$6 \leq N_t \leq 8 \quad (9),$$

where Nt is the total number of the lens elements included in the zoom lens.

Having lens elements not fewer than the lower limit of conditional expression (9) facilitates providing each lens unit in the zoom lens with an adequate refracting power and reducing aberrations. Having a small number of lens elements not more than the upper limit of conditional expression (9) is advantageous in making the zoom lens compact.

Having only three lens units, or the object side lens unit, the image side lens unit, and the intermediate lens unit, in the zoom lens provides a further advantage in reducing the size and cost of the zoom lens.

Alternatively, a lens unit that moves independently from the intermediate lens unit and the image side lens unit during zooming from the wide angle end to the telephoto end may be provided between the intermediate lens unit and the image side lens unit. This further facilitates a reduction in variations in aberrations.

In this case, the zoom lens may be a four-unit zoom lens including only four lens units.

If the zoom lens is designed in such a way that the object side lens unit moves first toward the image side and thereafter toward the object side during zooming from the wide angle end to the telephoto end, a reduction in the entire length of the zoom lens at both the wide angle end and the telephoto end is facilitated.

It is also preferred that the zoom ratio of the entire zoom lens system between the wide angle end and telephoto end satisfy the following condition:

$$3.2 < f_T/f_W < 7.0 \quad (10)$$

where $f_T$ is the focal length of the entire zoom lens system at the telephoto end, and $f_W$ is the focal length of the entire zoom lens system at the wide angle end.

A zoom lens having an adequately high zoom ratio not lower than the lower limit of conditional expression (10) has a high versatility.

If the upper limit of conditional expression (10) is not exceeded, the refracting power of each lens unit can easily be made small. This is advantageous in achieving good optical performance.

An image pickup apparatus according to the present invention has a zoom lens, which is preferably the above-described zoom lens, and an image pickup element that has an image pickup surface disposed on the image side of the zoom lens and converts an optical image on the image pickup surface formed by the zoom lens into an electrical signal.

Thus, there can be provided an image pickup apparatus equipped with a zoom lens that is advantageous in having an adequate zoom ratio, an adequate angle of field, and good optical performance while being compact.

It is also preferred that the image pickup apparatus be provided with a signal processing circuit that processes image data obtained by picking up an image by the image pickup element and outputs processed image data representing an image having a transformed shape, and the zoom lens satisfy the following condition in a state in which the zoom lens is set to the wide angle end and focused on the farthest distance:

$$0.7 < y_{07}/(f_W \tan \omega_{07w}) < 1.0 \quad (11)$$

where $y_{07}$ is defined by equation $y_{07}=0.7 \times y_{10}$, $y_{10}$ being the distance from the center of the effective image pick area of the image pickup element to the point farthest from the center within the effective image pickup area, wherein if the effective image pickup area changes during zooming from the wide angle end to the telephoto end, $y_{10}$ is the maximum value of the aforementioned distance, $\omega_{07w}$ is the angle formed by the optical axis and an incident ray in the object space of a principal ray that is incident on an image position at an image height of $y_{07}$ from the center of the image pickup surface at the wide angle end.

In the case of a zoom lens like that according to the present invention, there tends to be a trade-off between correction of astigmatism and correction of barrel distortion. In view of this, a certain degree of distortion may be allowed to be left in the image formed by the zoom lens, and distortion of the image may be corrected by image processing in the electronic image pickup apparatus equipped with the zoom optical system according to the present invention. This process will be described in detail in the following.

Suppose that an image of an object at infinity is formed by an optical system free from distortion. In this case, the image has no distortion, and the following equation holds:

$$f=y/\tan \omega \quad (A)$$

where y is the height of the image point from the optical axis, f is the focal length of the imaging optical system, ω is the angle of direction toward an object point corresponding to an image point formed at a position at distance y from the center of the image pickup surface with respect to the optical axis.

On the other hand, in the case of an optical system having barrel distortion only at zoom positions near the wide angle end, the following inequality holds:

$$f > y/\tan \omega \quad (B).$$

This means that if the values of $\omega$ and y are fixed, the focal length at the wide angle end may be longer. Therefore, it is made easier in the latter case to design a zoom lens with reduced aberrations. The reason why a lens unit corresponding to the above described object side lens unit is typically designed to have two or more lens components is that correction of distortion and correction of astigmatism are both to be achieved. This is not required in this mode of the invention. Therefore, this mode of the invention is advantageous in terms of astigmatism correction.

In the image pickup apparatus according to the present invention, the image data obtained by the image pickup element is processed by image processing. In this processing, the image data (or the shape of the image represented by the image data) is transformed in such a way that barrel distortion is corrected. Thus, the resultant image data will represent an image substantially geometrically similar to the object. Therefore, an image of the object may be output to a CRT or a printer based on this image data.

In cases where such correction of image data is performed, the effective image pickup area used at the wide angle end has a barrel shape. The image data representing the effective image pickup area having a barrel shape is transformed into image data representing a rectangular image.

Conditional expression (11) limits the degree of barrel distortion at the wide angle end of the zoom range. If conditional expression (11) is satisfied, correction of astigmatism can be achieved without difficulty. An image distorted in a barrel shape is photo-electrically converted by the image pickup element into image data containing barrel distortion. However, the image data containing barrel distortion is electrically processed by image processing means or a signal processing system in the electronic image pickup apparatus in such a way that the shape of the image is transformed. Thus, if the image data finally output from the image processing means is reproduced on a display apparatus, an image that has been corrected in terms of distortion and is substantially similar to the shape of the object can be obtained.

If the lower limit of conditional expression (10) is not exceeded so that distortion generated in the zoom lens is made small, when image distortion attributed to distortion of the zoom lens is corrected by the signal processing circuit, the rate of expansion of the peripheral region of the image in radial directions after the correction is made small. This helps to reduce deterioration of image sharpness in the peripheral region of the image.

If the upper limit of conditional expression (10) is not exceeded and the zoom lens is allowed to have distortion, correction of astigmatism of the zoom lens is facilitated, which is advantageous in slimming the zoom lens.

Although the effective image pickup area at the wide angle end may be designed in such a way that distortion is completely corrected, an appropriate degree of barrel distortion such as distortion of approximately −3% or −5% may be left after transformation of image data in view of the effect of perspective and deterioration of image quality in the peripheral region of the image.

It is more preferred that the limit values in the conditional expressions presented above be changed as follows.

It is more preferred that the lower limit value of conditional expression (1) be changed to −0.40, more preferably −0.36.

It is more preferred that the upper limit value of conditional expression (1) be changed to 0.10, more preferably 0.07.

Changing the upper limit value of conditional expression (1) to −0.01 to make the refracting power of the front lens component in the image side lens unit negative facilitates correction of chromatic aberration in the image side lens unit.

It is more preferred that the lower limit value of conditional expression (2) be changed to −8.0, more preferably −4.0.

It is more preferred that the upper limit value of conditional expression (2) be changed to −1.3, more preferably −1.5.

It is more preferred that the lower limit value of conditional expression (3) be changed to −50.0, more preferably −20.0.

It is more preferred that the upper limit value of conditional expression (3) be changed to −5.0, more preferably −7.0.

It is more preferred that the lower limit value of conditional expression (4) be changed to 1.05, more preferably 1.1.

It is more preferred that the upper limit value of conditional expression (4) be changed to 2.7, more preferably 2.3.

It is more preferred that the lower limit value of conditional expression (5) be changed to −1.25, more preferably −1.2.

It is more preferred that the upper limit value of conditional expression (5) be changed to −0.55, more preferably −0.6.

It is more preferred that the lower limit value of conditional expression (6) be changed to 2.0, more preferably 2.4.

It is more preferred that the upper limit value of conditional expression (6) be changed to 3.5, more preferably 3.0.

It is more preferred that the lower limit value of conditional expression (7) be changed to 1.50, more preferably 1.52.

It is more preferred that the lower limit value of conditional expression (8) be changed to 58, more preferably 80.

It is more preferred that the lower limit value of conditional expression (10) be changed to 3.4.

It is more preferred that the upper limit value of conditional expression (10) be changed to 5.0.

It is more preferred that the lower limit value of conditional expression (11) be changed to 0.75, more preferably 0.80.

It is more preferred that the upper limit value of conditional expression (11) be changed to 0.99, more preferably 0.97.

In order to facilitate a reduction in the cost of the lens elements in the image side lens unit, it is preferred that an upper limit be placed on the value of $n_{Iave}$, and materials that satisfy the following condition be used:

$$n_{Iave} \leq 2.2 \quad (7A),$$

more preferably, materials that satisfy the following condition be used:

$$n_{Iave} \leq 1.8 \quad (7A'$$

In order to facilitate a reduction in the cost of the lens elements in the image side lens unit, it is preferred that a lower limit be placed on the value of $\upsilon_{Iave}$, and materials that satisfy the following condition be used:

$$\upsilon hd\ Iave23\ 95 \quad (12A),$$

more preferably, materials that satisfy the following condition be used:

$$\upsilon_{Iave} \leq 82 \quad (12A')$$

still more preferably, materials that satisfy the following condition be used $$\upsilon_{Iave} \leq 58 \quad (12A'').$$

In the case where the zoom lens has a focusing function, the conditions and features of the zoom lens according to the present invention described in the foregoing should be regarded as conditions and features in the state in which the zoom lens is focused on an object at the farthest distance.

It is preferred that focusing operation from an object at a long distance to an object at a short distance be performed by advancing the entire zoom lens toward the object side, advancing only the object side lens unit toward the object side, or advancing only the image side lens unit toward the object side.

It is more preferred that two or more of the above described conditions and features be adopted at the same time.

According to the present invention, there can be provided a zoom lens that can easily be designed to have good optical performance while being advantageous in achieving size reduction and in having an adequate zoom ratio. There also can be provided an image pickup apparatus equipped with such a zoom lens.

In the following, first to eighth embodiments of the zoom lens according to the present invention will be described. FIGS. 1A, 1B and 1C to 8A, 8B and 8C are cross sectional views of the zoom lenses according to the first to the eighth embodiments respectively at the wide angle end (FIGS. 1A to 8A), in an intermediate focal length state (FIGS. 1B to 8B), and at the telephoto end (FIGS. 1C to 8C) in the state in which the zoom lenses are focused on an object point at infinity. In FIGS. 1A through 8C, a first lens unit is denoted by G1, a second lens unit is denoted by G2, an aperture stop is denoted by S, a third lens unit is denoted by G3, a fourth lens unit is denoted by G4, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have the function of a low pass filter.

The first lens unit G1 corresponds to the object side lens unit, the second lens unit G2 corresponds to the intermediate lens unit, and the third lens unit G3 in the first to seventh embodiments and the fourth lens unit G4 in the eighth embodiment correspond to the image side lens unit.

In all the embodiments, the aperture stop S moves integrally with the second lens unit G2. All the numerical data presented below are for the state in which the zoom lens is focused on an object at infinity. In the numerical data, dimensions are in mm (millimeters) and angles are in degrees. Zoom data will be presented for the states at the wide angle end (WE), in the intermediate focal length states (ST) defined in the present invention, and at the telephoto end (TE).

Figure 1B:
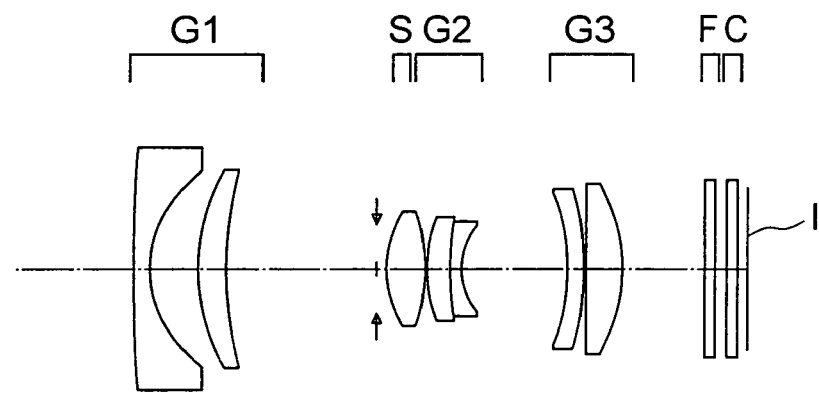
Figure 1C:
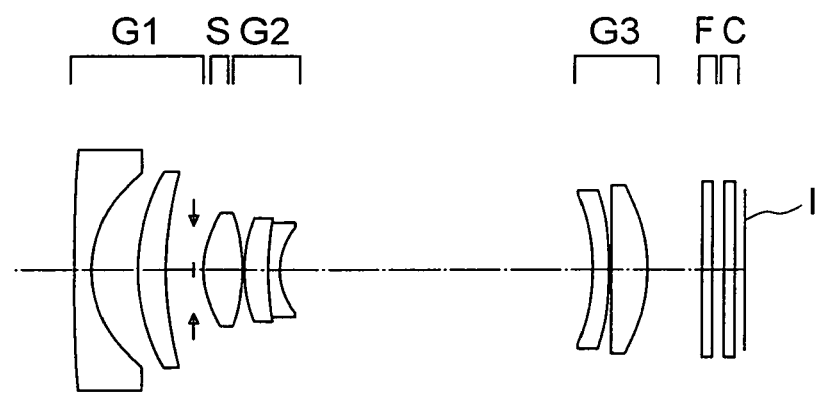

As shown in FIGS. 1A to 1C, the zoom lens according to the first embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 first moves toward the image side and thereafter moves toward the object side, the second lens unit G2 moves only toward the object side, and the third lens unit G3 moves first toward the object side and thereafter toward the image side. The third lens unit G3 is located closer to the image side at the telephoto end than at the wide angle end.

The first lens unit G1 is composed of a biconcave negative lens and a positive meniscus lens having a convex surface directed toward the object side. The second lens unit G2 is composed of a biconvex positive lens, a cemented lens made up of a positive meniscus lens having a convex surface directed toward the object side and a negative meniscus lens having a convex surface directed toward the object side. The third lens unit G3 is composed of a negative meniscus lens (which is a resin lens) having a convex surface directed toward the image side and a positive meniscus lens (which is a resin lens) having a convex surface directed toward the image side. All the lens elements in each lens unit G1, G2, G3 are arranged in the mentioned order from the object side.

The following five lens surfaces are aspheric surfaces: both surfaces of the biconcave negative lens in the first lens unit G1, both surfaces of the biconvex positive lens in the second lens unit G2, and the image side surface of the positive meniscus lens having a convex surface directed toward the image side in the third lens unit G3.

Figure 2A:
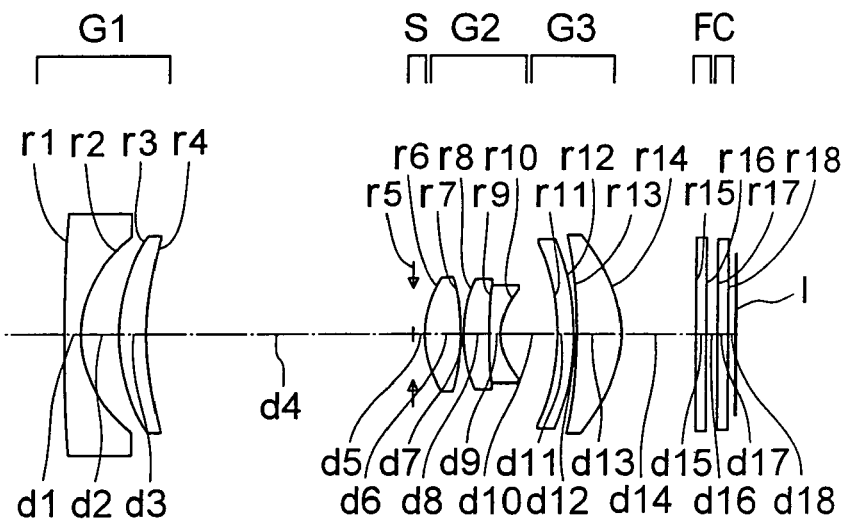
FIGS. 2A, 2B, and 2C are cross sectional views similar to FIGS. 1A, 1B, and 1C showing a zoom lens according to a second embodiment of the present invention.
Figure 2B:
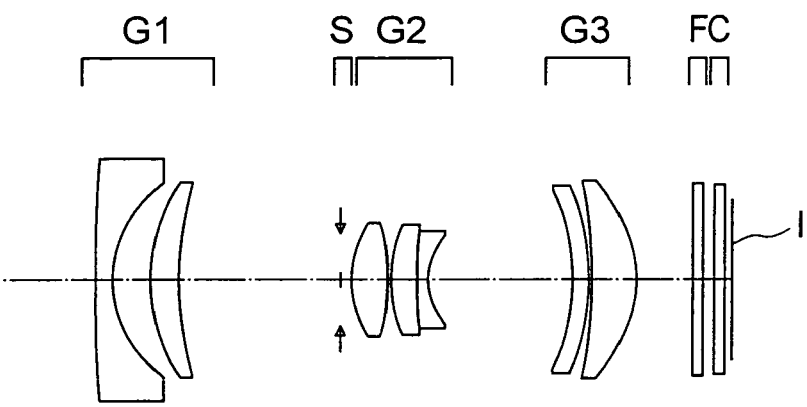
Figure 2C:
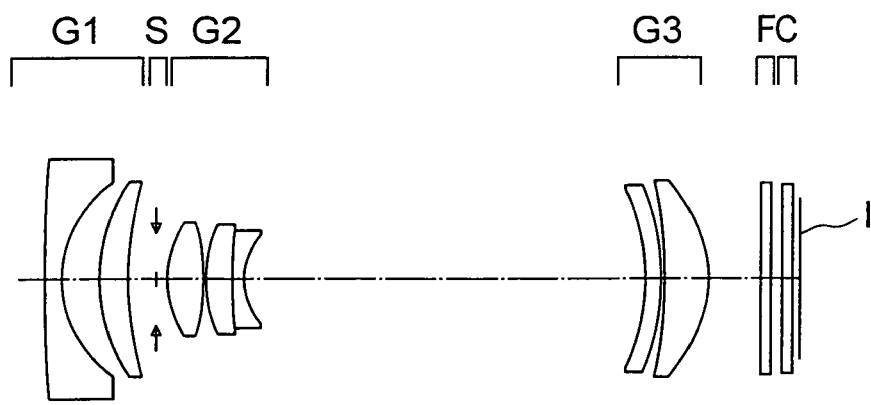

As shown in FIGS. 2A to 2C, the zoom lens according to the second embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 first moves toward the image side and thereafter moves toward the object side, the second lens unit G2 moves only toward the object side, and the third lens unit G3 moves only toward the image side.

The first lens unit G1 is composed of a biconcave negative lens and a positive meniscus lens having a convex surface directed toward the object side. The second lens unit G2 is composed of a biconvex positive lens, and a cemented lens made up of a positive meniscus lens having a convex surface directed toward the object side and a negative meniscus lens having a convex surface directed toward the object side. The third lens unit G3 is composed of a first positive meniscus lens (which is a resin lens) having a convex surface directed toward the image side and a second positive meniscus lens (which is a resin lens) having a convex surface directed toward the image side. All the lens elements in each lens unit G1, G2, G3 are arranged in the mentioned order from the object side.

The following six lens surfaces are aspheric surfaces: both surfaces of the biconcave negative lens in the first lens unit G1, both surfaces of the biconvex positive lens in the second lens unit G2, the object side surface of the first positive meniscus lens having a convex surface directed toward to the image side in the third lens unit G3, and the image side surface of the second positive meniscus lens having a convex surface directed toward the image side in the third lens unit G3.

Figure 3A:
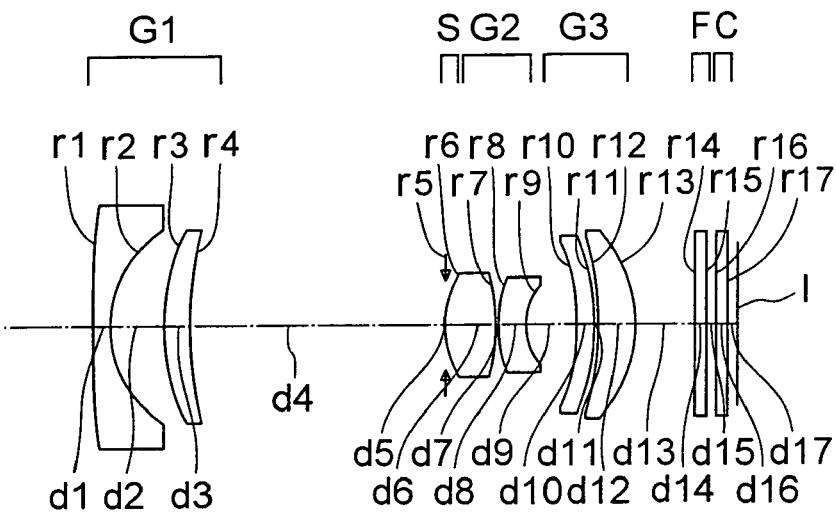
FIGS. 3A, 3B, and 3C are cross sectional views similar to FIGS. 1A, 1B, and 1C showing a zoom lens according to a third embodiment of the present invention.
Figure 3B:
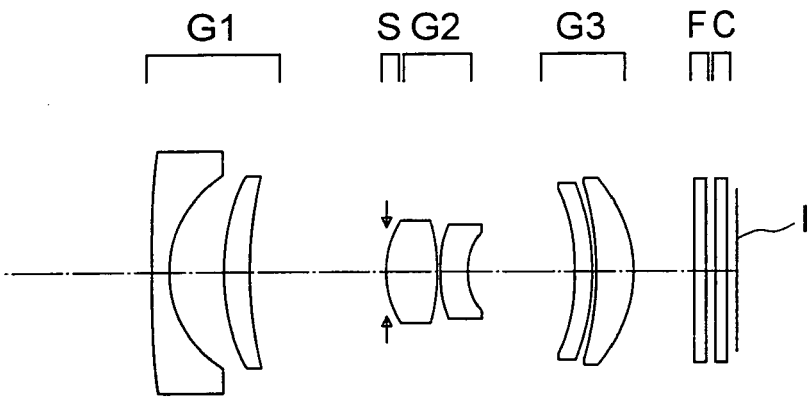
Figure 3C:
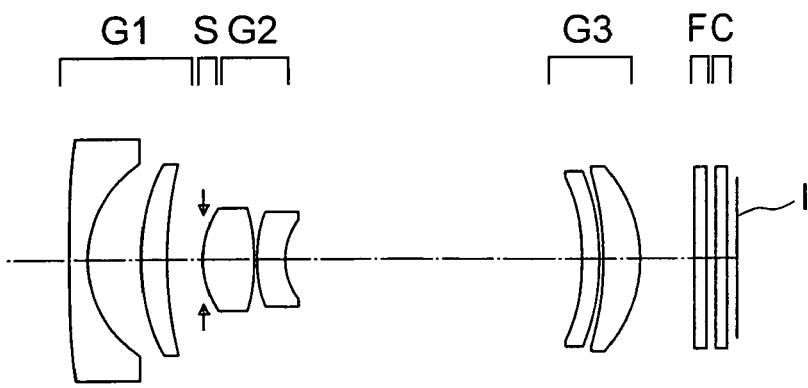

As shown in FIGS. 3A to 3C, the zoom lens according to the third embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 first moves toward the image side and thereafter moves toward the object side, the second lens unit G2 moves only toward the object side, and the third lens unit G3 moves first toward the object side and thereafter toward the image side. The third lens unit G3 is located closer to the image side at the telephoto end than at the wide angle end.

The first lens unit G1 is composed of a biconcave negative lens and a positive meniscus lens having a convex surface directed toward the object side. The second lens unit G2 is composed of a biconvex positive lens and a negative meniscus lens having a convex surface directed toward the object side. The third lens unit G3 is composed of a negative meniscus lens (which is a resin lens) having a convex surface directed toward the image side and a positive meniscus lens (which is a resin lens) having a convex surface directed toward the image side. All the lens elements in each lens unit G1, G2, G3 are arranged in the mentioned order from the object side.

The following six lens surfaces are aspheric surfaces: both surfaces of the biconcave negative lens in the first lens unit G1, the object side surface of the positive meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 4A:
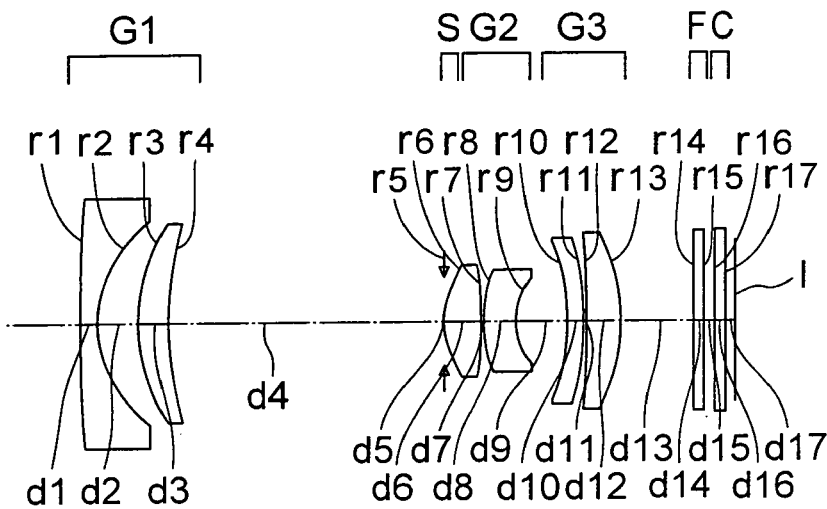
FIGS. 4A, 4B, and 4C are cross sectional views similar to FIGS. 1A, 1B, and 1C showing a zoom lens according to a fourth embodiment of the present invention.
Figure 4B:
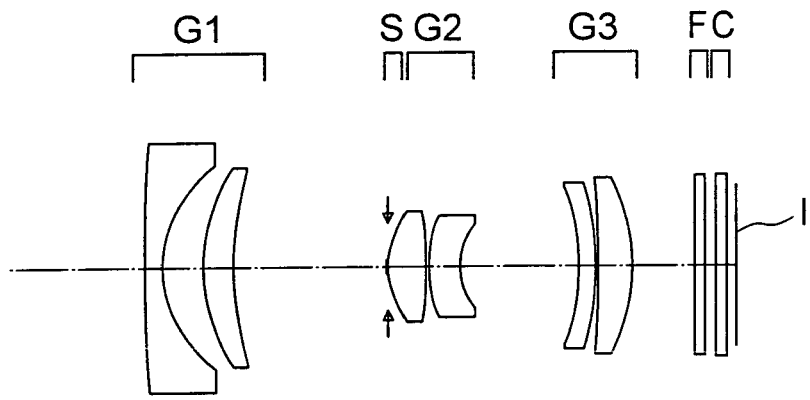
Figure 4C:
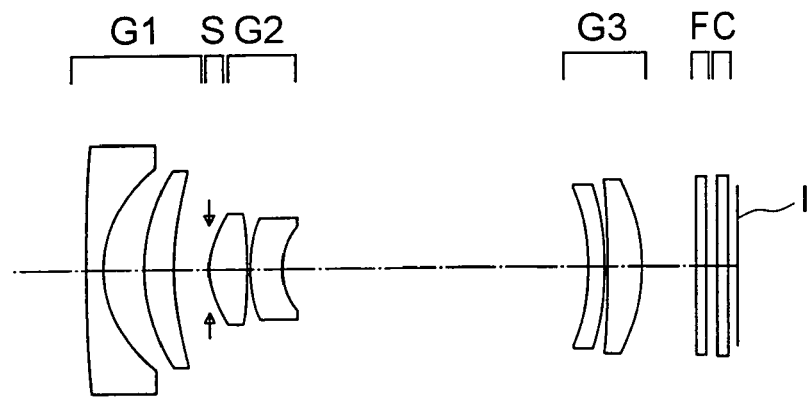

As shown in FIGS. 4A to 4C, the zoom lens according to the fourth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 first moves toward the image side and thereafter moves toward the object side, the second lens unit G2 moves only toward the object side, and the third lens unit G3 moves only toward the image side.

The first lens unit G1 is composed of a biconcave negative lens and a positive meniscus lens having a convex surface directed toward the object side. The second lens unit G2 is composed of a biconvex positive lens and a negative meniscus lens having a convex surface directed toward the object side. The third lens unit G3 is composed of a negative meniscus lens (which is a resin lens) having a convex surface directed toward the image side and a positive meniscus lens (which is a resin lens) having a convex surface directed toward the image side. All the lens elements in each lens unit G1, G2, G3 are arranged in the mentioned order from the object side.

The following seven lens surfaces are aspheric surfaces: both surfaces of the biconcave negative lens in the first lens unit G1, both surfaces of the biconvex positive lens in the second lens unit G2, the image side surface of the negative meniscus lens having a convex surface directed toward the object side in the second lens unit G2, the object side surface of the negative meniscus lens having a convex surface directed toward the image side in the third lens unit G3, and the image side surface of the positive meniscus lens having a convex surface directed toward the image side in the third lens unit G3.

Figure 5A:
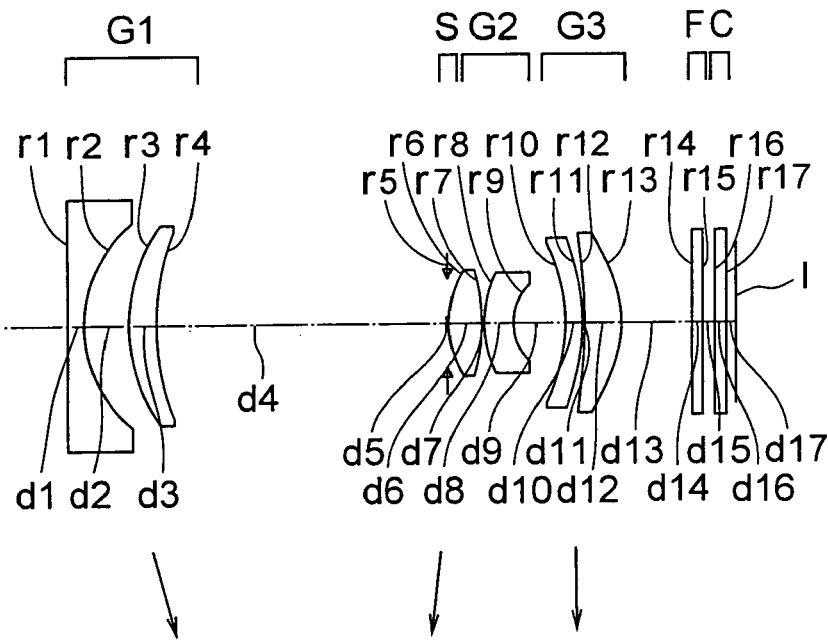
FIGS. 5A, 5B, and 5C are cross sectional views similar to FIGS. 1A, 1B, and 1C showing a zoom lens according to a fifth embodiment of the present invention.
Figure 5B:
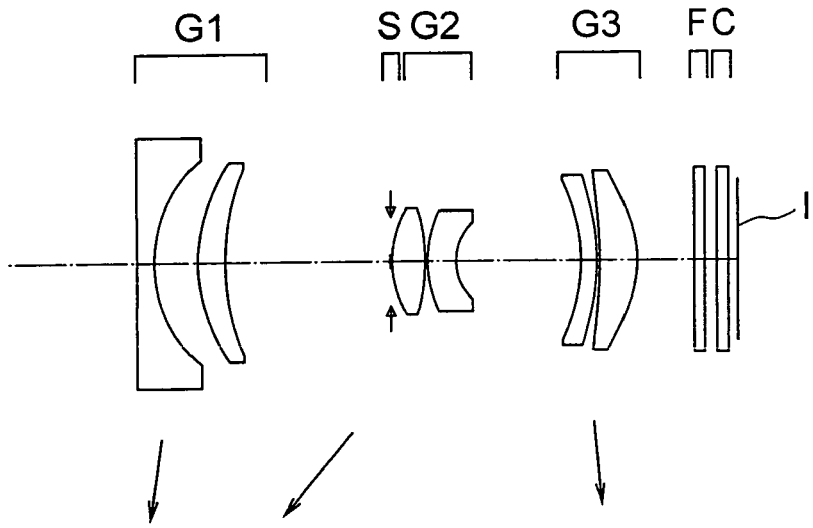
Figure 5C:
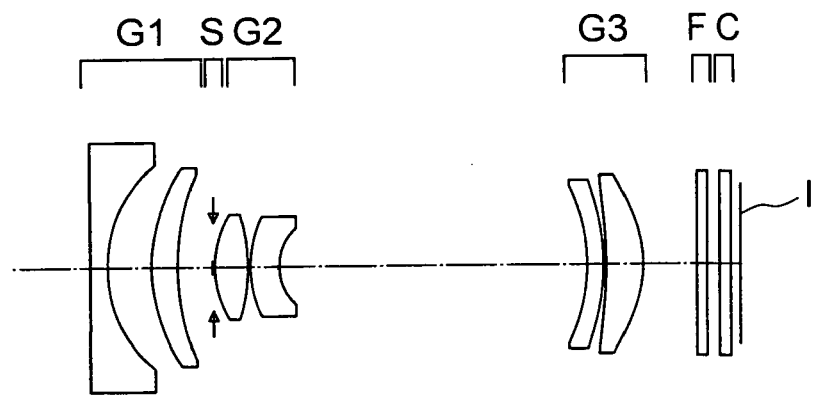

As shown in FIGS. 5A to 5C, the zoom lens according to the fifth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 first moves toward the image side and thereafter moves toward the object side, the second lens unit G2 moves only toward the object side, and the third lens unit G3 moves only toward the image side.

The first lens unit G1 is composed of a negative meniscus lens having a convex surface directed toward the object side and a positive meniscus lens having a convex surface directed toward the object side. The second lens unit G2 is composed of a biconvex positive lens and a negative meniscus lens having a convex surface directed toward the object side. The third lens unit G3 is composed of a negative meniscus lens (which is a resin lens) having a convex surface directed toward the image side and a positive meniscus lens (which is a resin lens) having a convex surface directed toward the image side. All the lens elements in each lens unit G1, G2, G3 are arranged in the mentioned order from the object side.

The following four lens surfaces are aspheric surfaces: the image side surface of the negative meniscus lens having a convex surface directed toward the object side in the first lens unit G1, both surfaces of the biconvex positive lens in the second lens unit G2, and the image side surface of the positive meniscus lens having a convex surface directed toward the image side in the third lens unit G3.

Figure 6A:
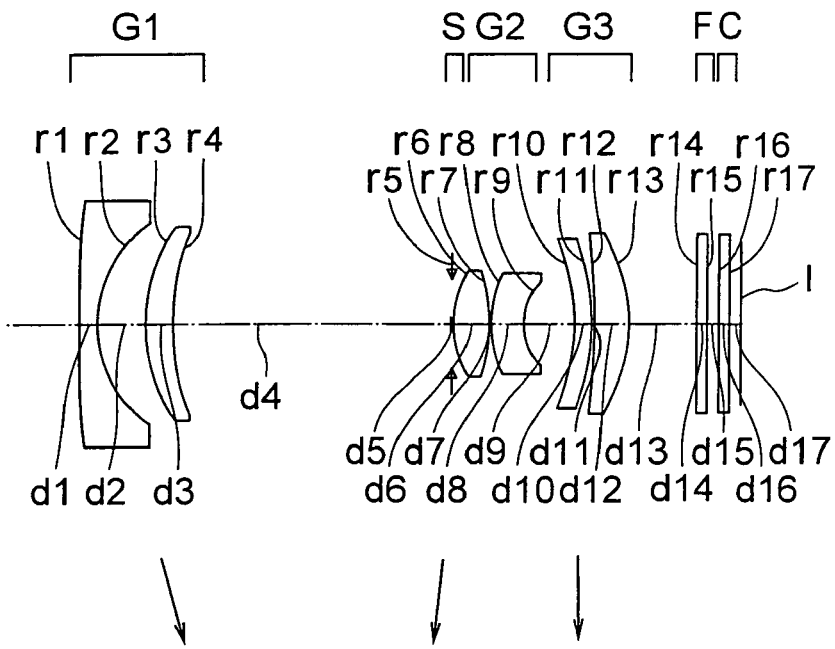
FIGS. 6A, 6B, and 6C are cross sectional views similar to FIGS. 1A, 1B, and 1C showing a zoom lens according to a sixth embodiment of the present invention.
Figure 6B:
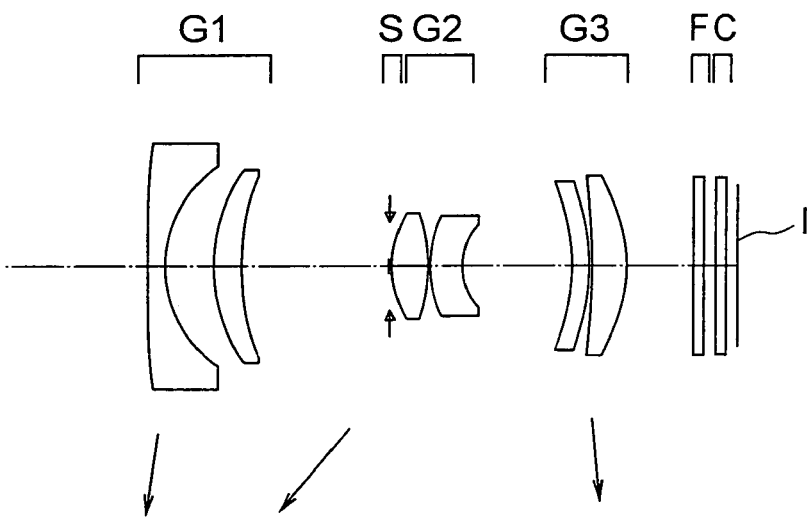
Figure 6C:
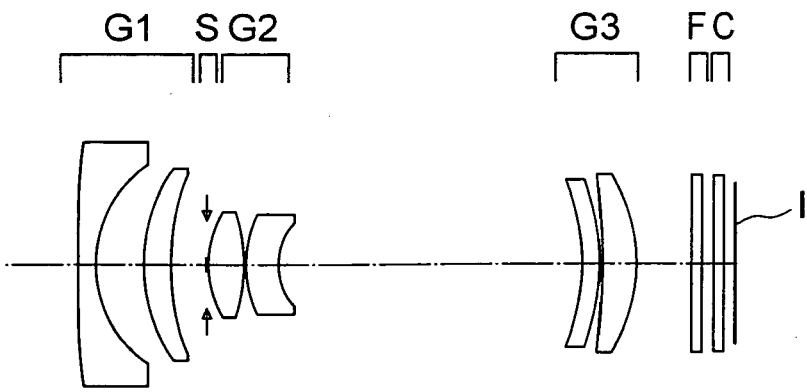

As shown in FIGS. 6A to 6C, the zoom lens according to the sixth embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 first moves toward the image side and thereafter moves toward the object side, the second lens unit G2 moves only toward the object side, and the third lens unit G3 moves only toward the image side.

The first lens unit G1 is composed of a biconcave negative lens and a positive meniscus lens having a convex surface directed toward the object side. The second lens unit G2 is composed of a biconvex positive lens and a negative meniscus lens having a convex surface directed toward the object side. The third lens unit G3 is composed of a negative meniscus lens having a convex surface directed toward the image side and a positive meniscus lens having a convex surface directed toward the image side. All the lens elements in each lens unit G1, G2, G3 are arranged in the mentioned order from the object side.

The following five lens surfaces are aspheric surfaces: both surfaces of the biconcave negative lens in the first lens unit G1, both surfaces of the biconvex positive lens in the second lens unit G2, and the image side surface of the positive meniscus lens having a convex surface directed toward the image side in the third lens unit G3.

Figure 7A:
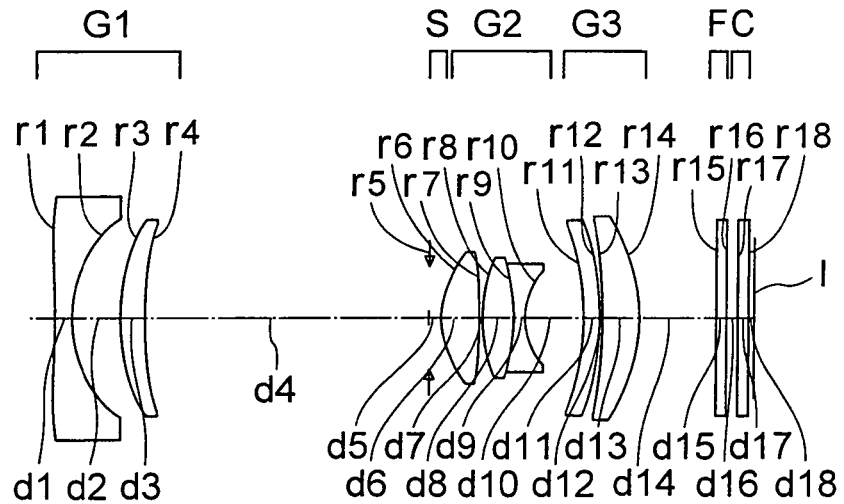
FIGS. 7A, 7B, and 7C are cross sectional views similar to FIGS. 1A, 1B, and 1C showing a zoom lens according to a seventh embodiment of the present invention.
Figure 7B:
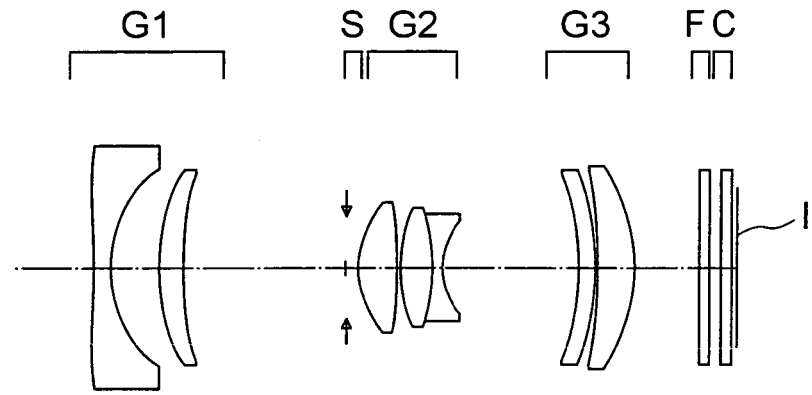
Figure 7C:
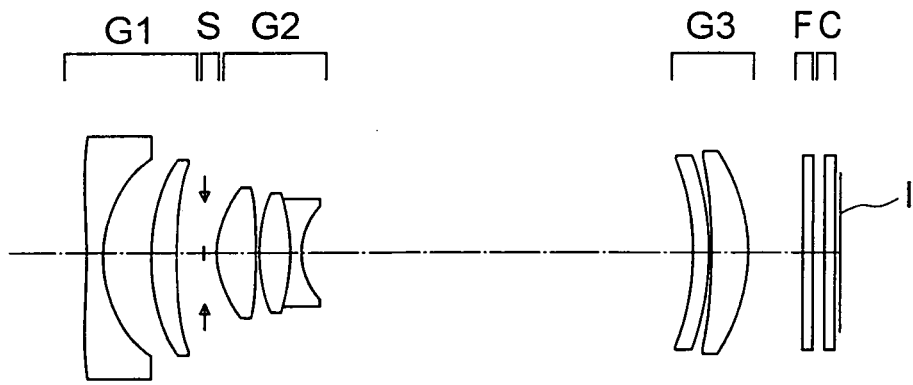

As shown in FIGS. 7A to 7C, the zoom lens according to the seventh embodiment includes, in order from the object side thereof, a first lens unit G1 having a negative refracting power, an aperture stop S, a second lens unit G2 having a positive refracting power, and a third lens unit G3 having a positive refracting power.

During zooming from the wide angle end to the telephoto end, the first lens unit G1 first moves toward the image side and thereafter moves toward the object side, the second lens unit G2 moves only toward the object side, and the third lens unit G3 moves only toward the image side.

The first lens unit G1 is composed of a biconcave negative lens and a positive meniscus lens having a convex surface directed toward the object side. The second lens unit G2 is composed of a first biconvex positive lens, and a cemented lens made up of a second biconvex positive lens and a biconcave negative lens. The third lens unit G3 is composed of a negative meniscus lens (which is a resin lens) having a convex surface directed toward the image side and a positive meniscus lens (which is a resin lens) having a convex surface directed toward the image side. All the lens elements in each lens unit G1, G2, G3 are arranged in the mentioned order from the object side.

The following seven lens surfaces are aspheric surfaces: both surfaces of the biconcave negative lens in the first lens unit G1, both surfaces of the first biconvex positive lens in the second lens unit G2, the image side surface of the biconcave negative lens in the second lens unit G2, the object side surface of the negative meniscus lens having a convex surface directed toward the image side in the third lens unit G3, and the image side surface of the positive meniscus lens having a convex surface directed toward the image side in the third lens unit G3.

Figure 8A:
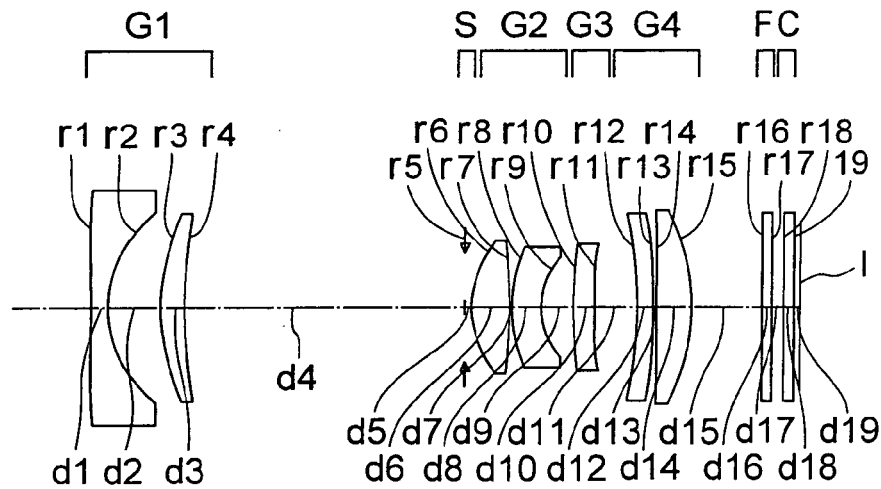
FIGS. 8A, 8B, and 8C are cross sectional views similar to FIGS. 1A, 1B, and 1C showing a zoom lens according to a eighth embodiment of the present invention.
Figure 8B:
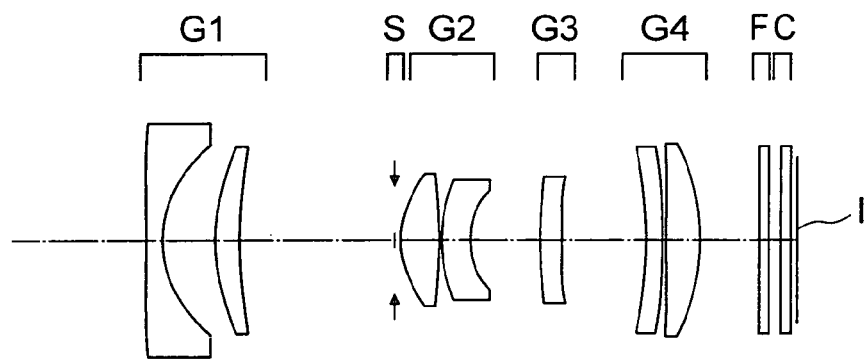
Figure 8C:
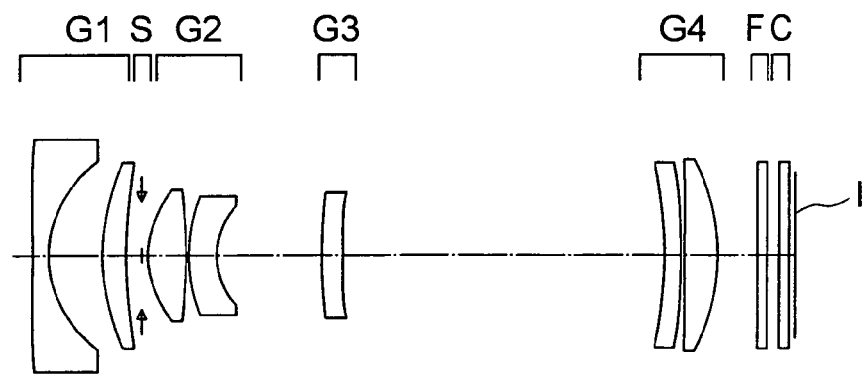
Figure 9A:
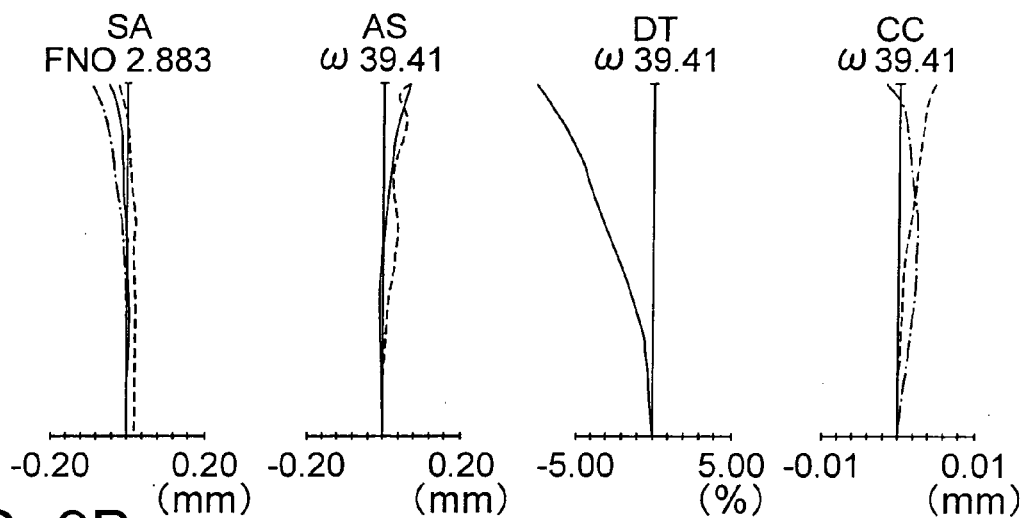
FIGS. 9A, 9B and 9C are diagrams showing spherical aberration, astigmatism, distortion, and chromatic aberration of magnification of the zoom lens according to the first embodiment in the state in which the zoom lens is focused on an object point at infinity respectively at the wide angle end (FIG. 9A), in the intermediate state (FIG. 9B), and the telephoto end (FIG. 9C)
Figure 9B:
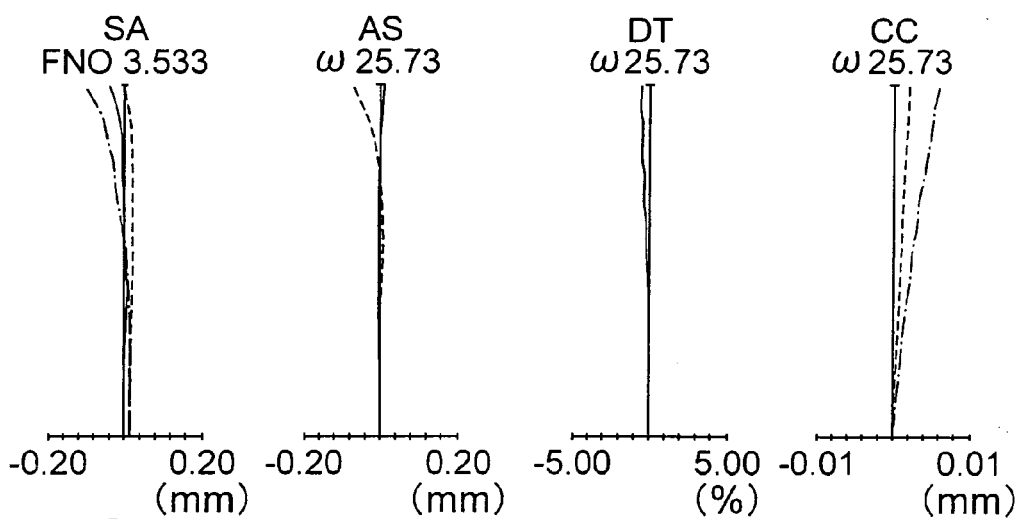
Figure 9C:
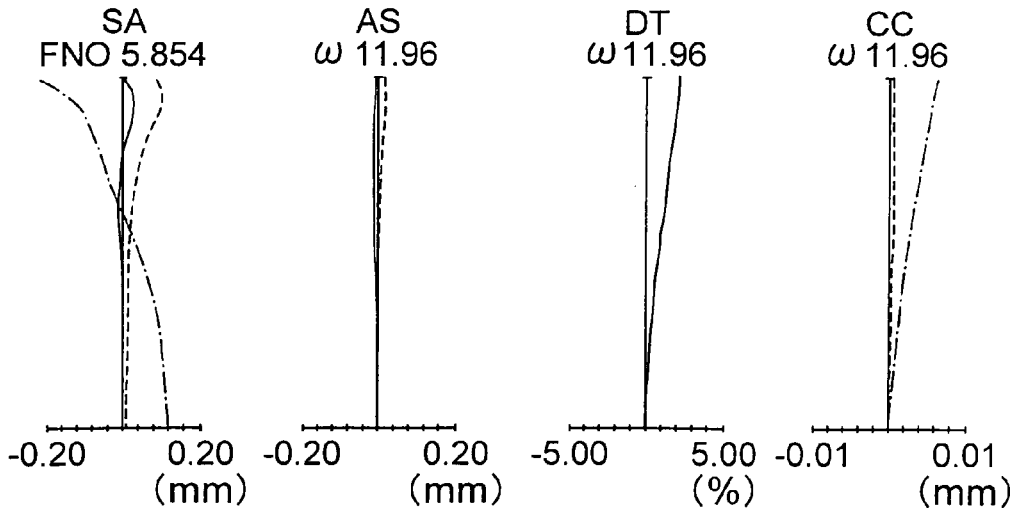
Figure 10A:
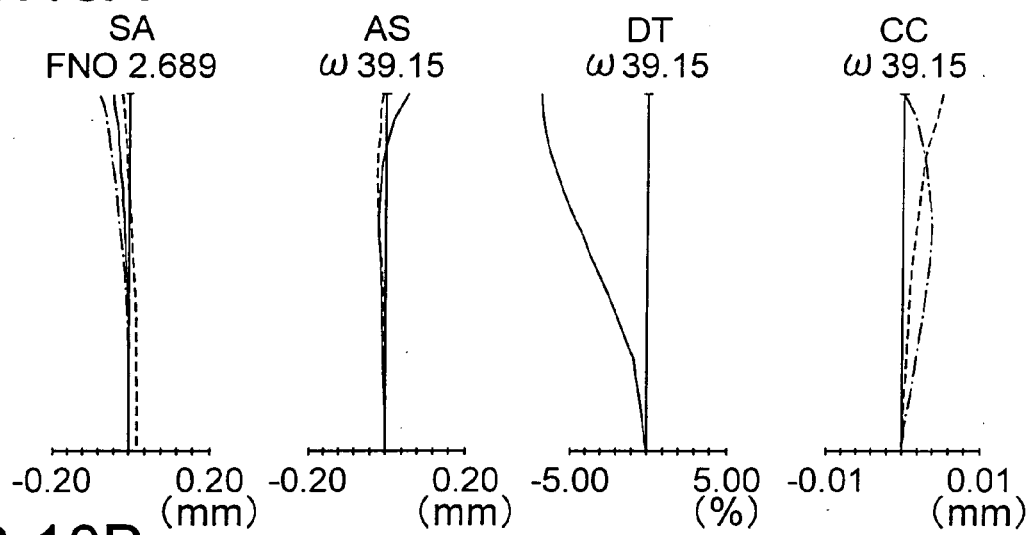
FIGS. 10A, 10B, and 10C are diagrams similar to FIGS. 9A, 9B, and 9C showing aberrations of the zoom lens according to the second embodiment in the state in which the zoom lens is focused on an object point at infinity.
Figure 10B:
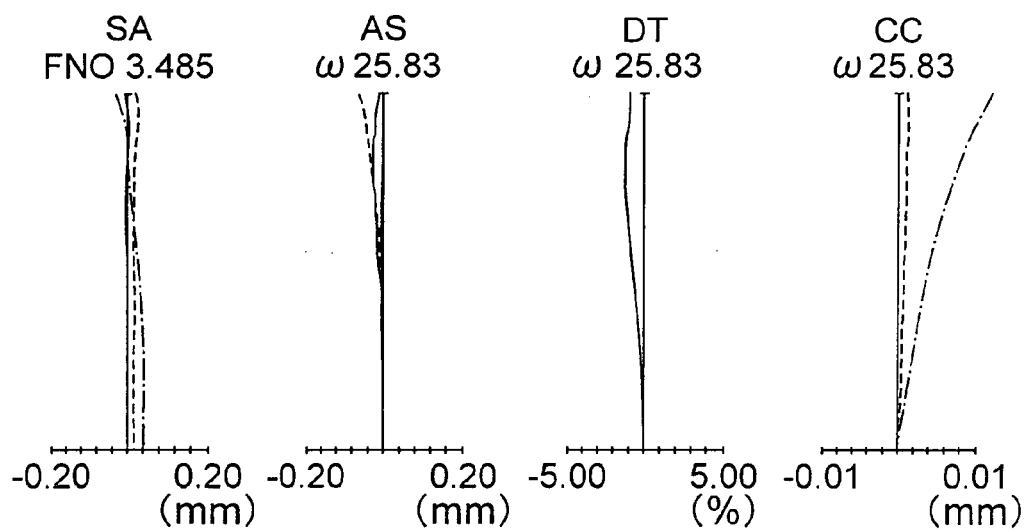
Figure 10C:
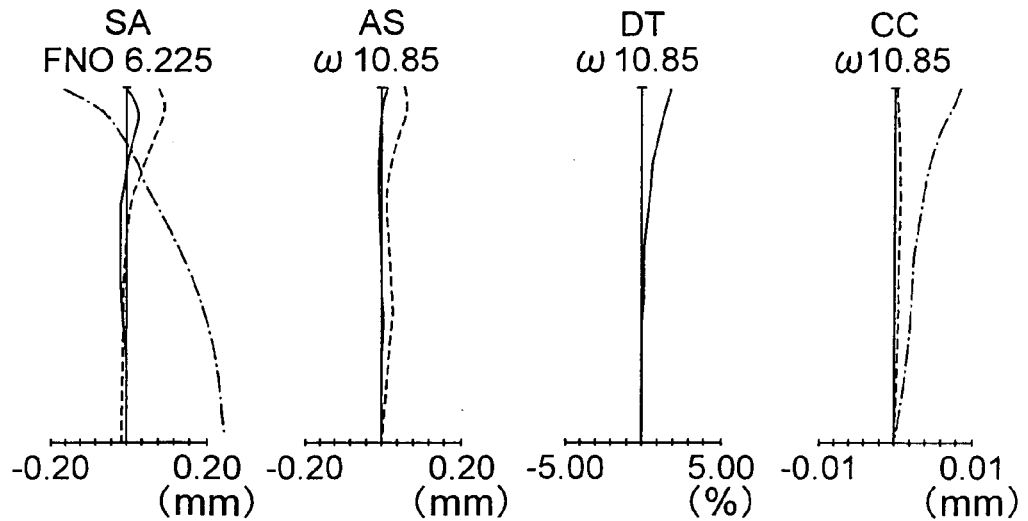
Figure 11A:
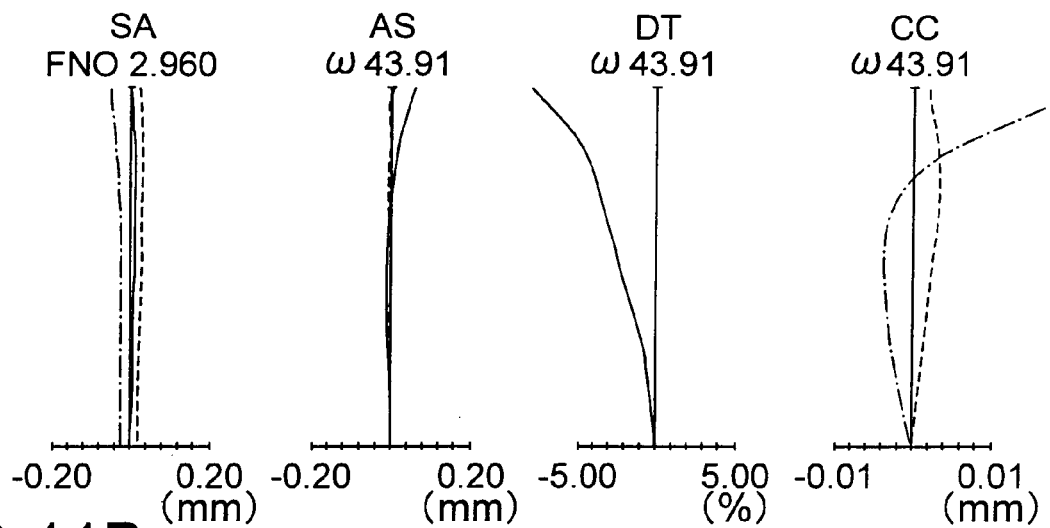
FIGS. 11A, 11B, and 11C are diagrams similar to FIGS. 9A, 9B, and 9C showing aberrations of the zoom lens according to the third embodiment in the state in which the zoom lens is focused on an object point at infinity.
Figure 11B:
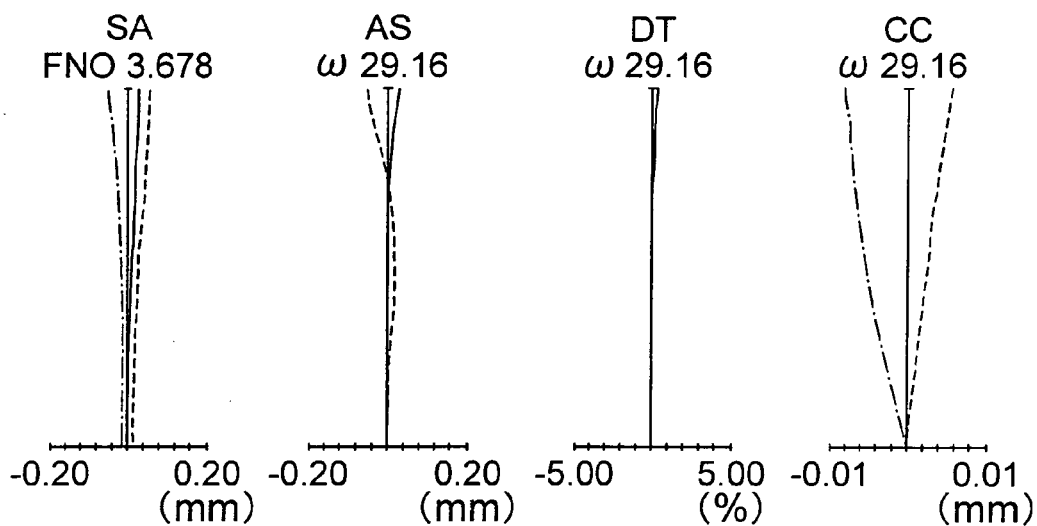
Figure 11C:
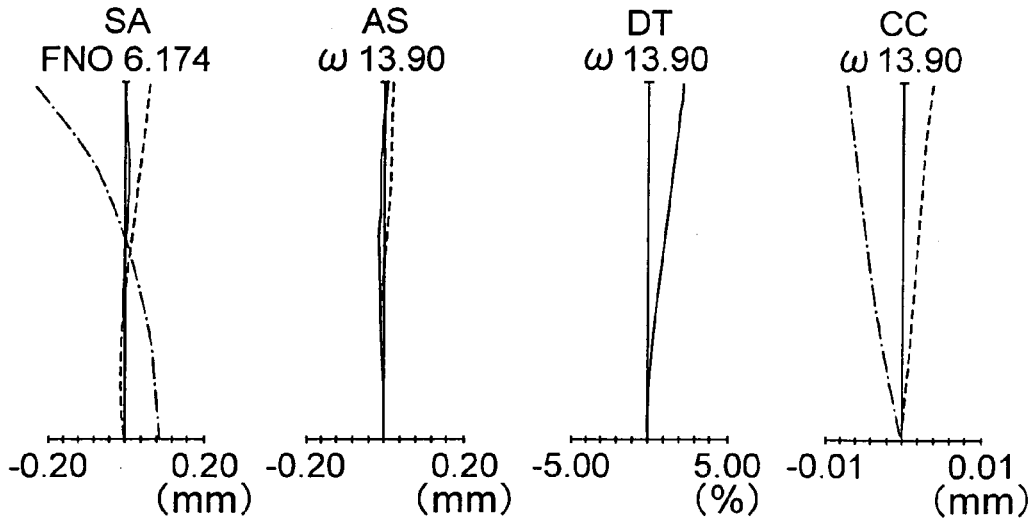
Figure 12A:
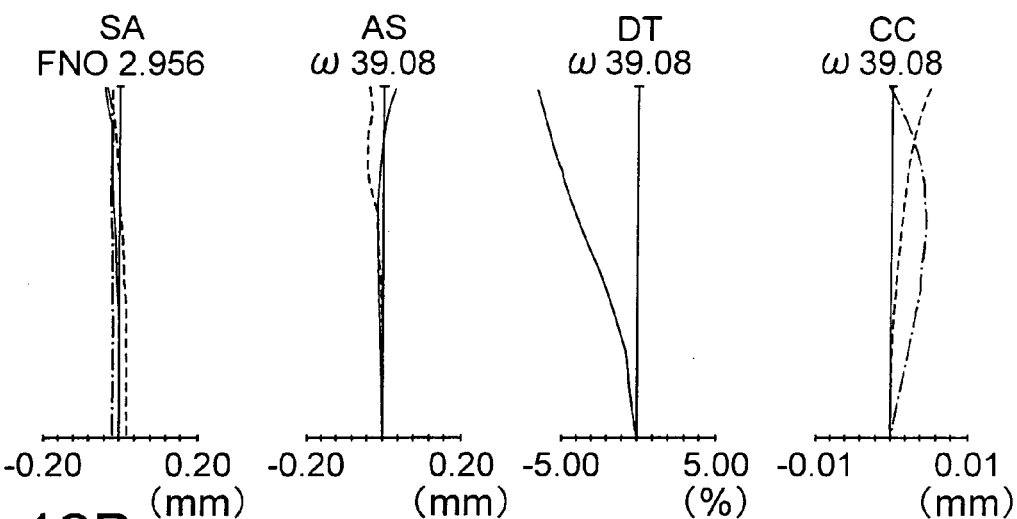
FIGS. 12A, 12B, and 12C are diagrams similar to FIGS. 9A, 9B, and 9C showing aberrations of the zoom lens according to the fourth embodiment in the state in which the zoom lens is focused on an object point at infinity.
Figure 12B:
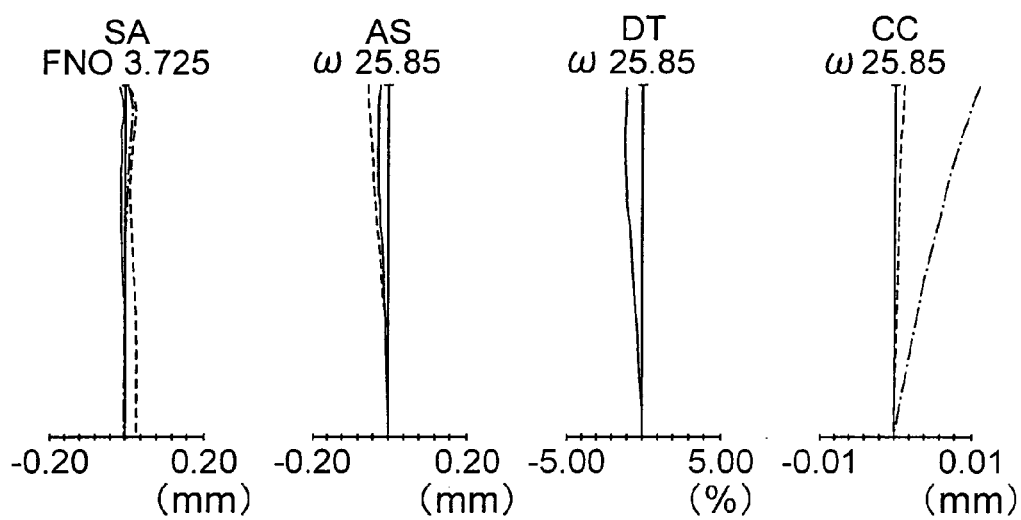
Figure 12C:
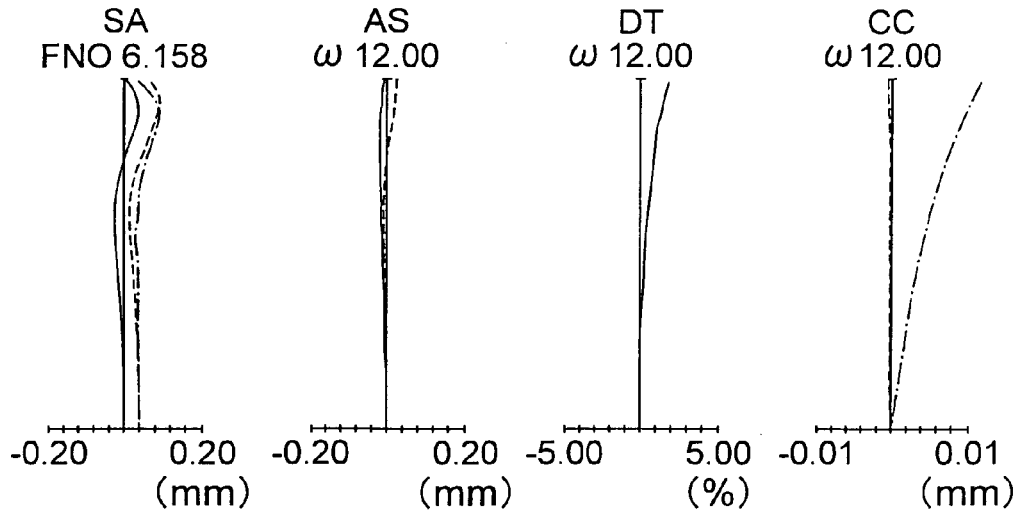
Figure 13A:
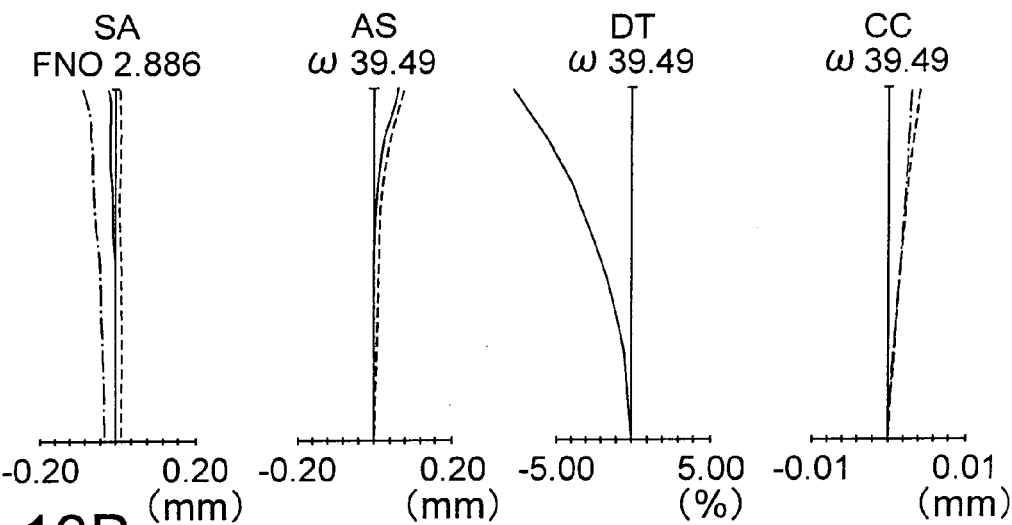
FIGS. 13A, 13B, and 13C are diagrams similar to FIGS. 9A, 9B, and 9C showing aberrations of the zoom lens according to the fifth embodiment in the state in which the zoom lens is focused on an object point at infinity.
Figure 13B:
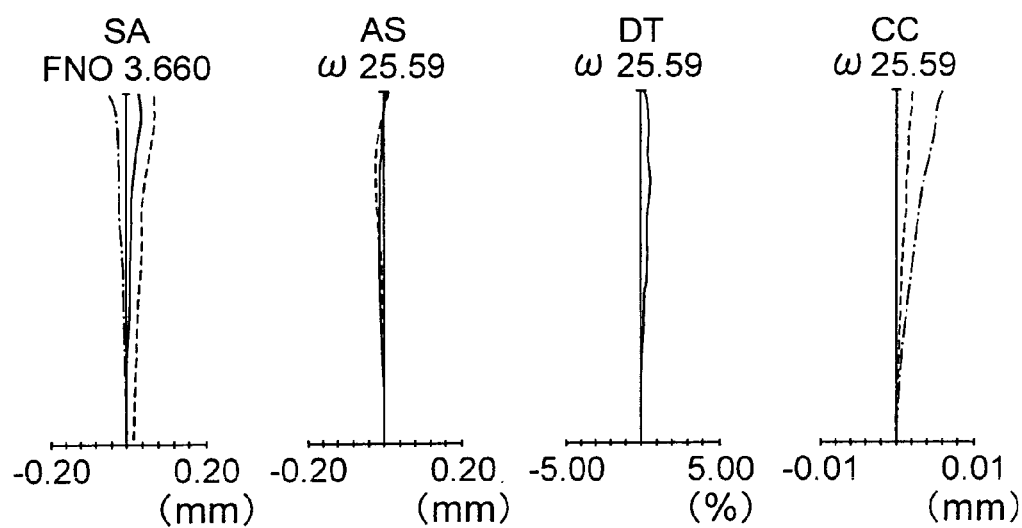
Figure 13C:
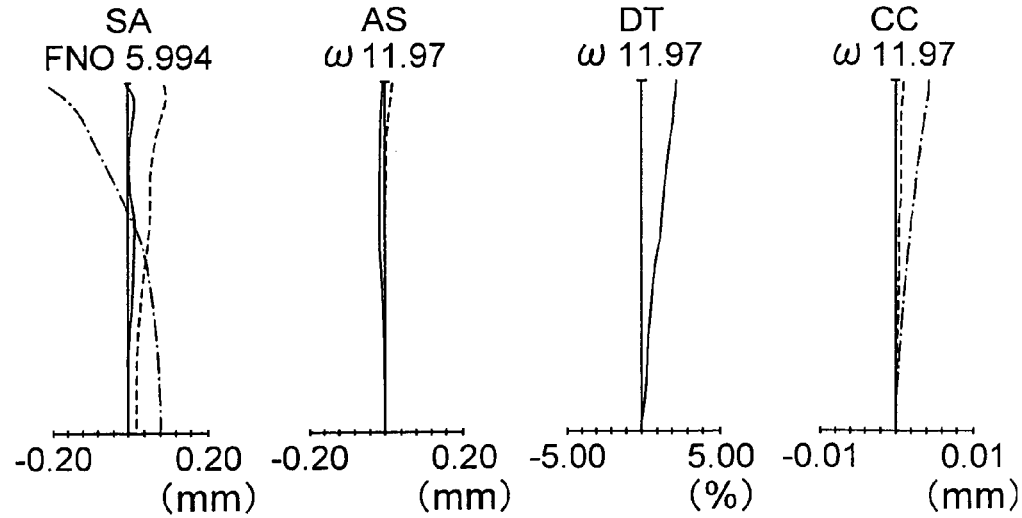
Figure 14A:
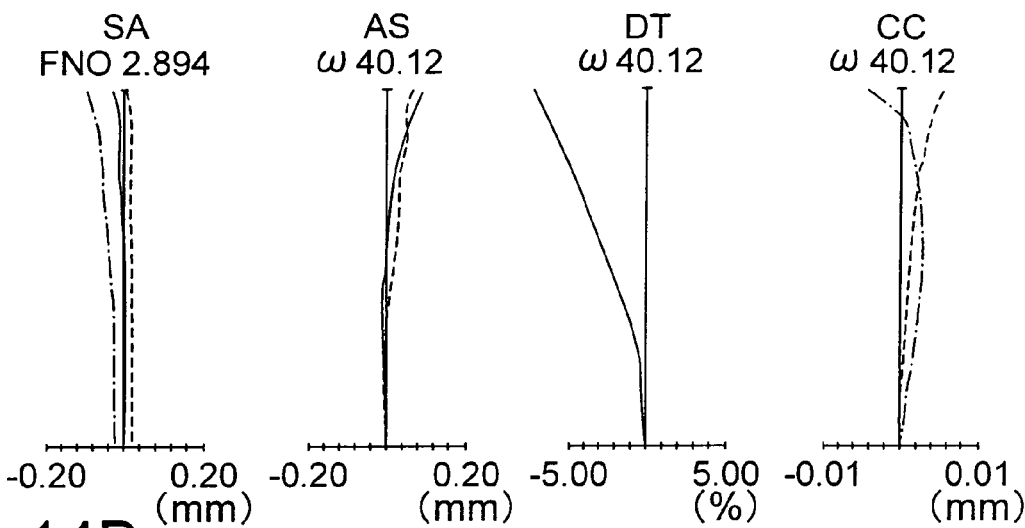
FIGS. 14A, 14B, and 14C are diagrams similar to FIGS. 9A, 9B, and 9C showing aberrations of the zoom lens according to the sixth embodiment in the state in which the zoom lens is focused on an object point at infinity.
Figure 14B:
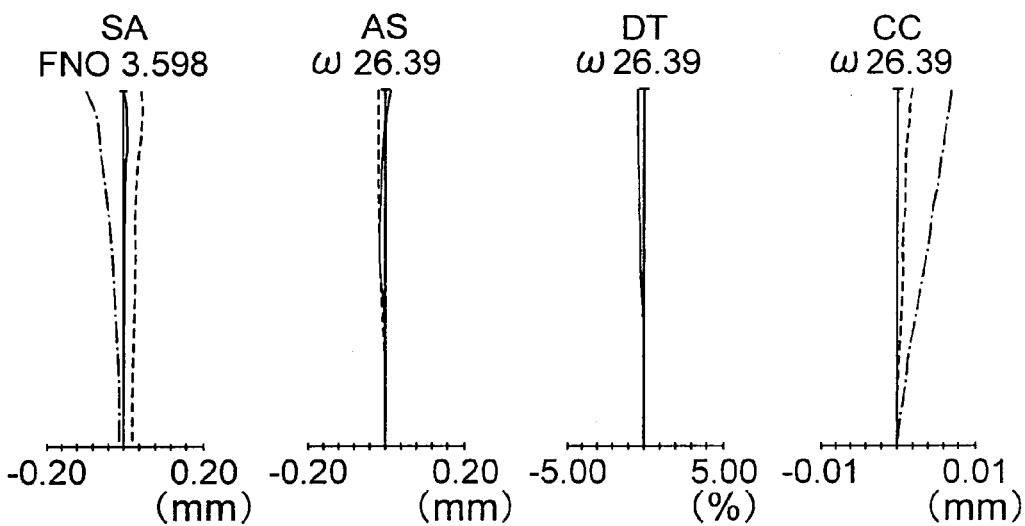
Figure 14C:
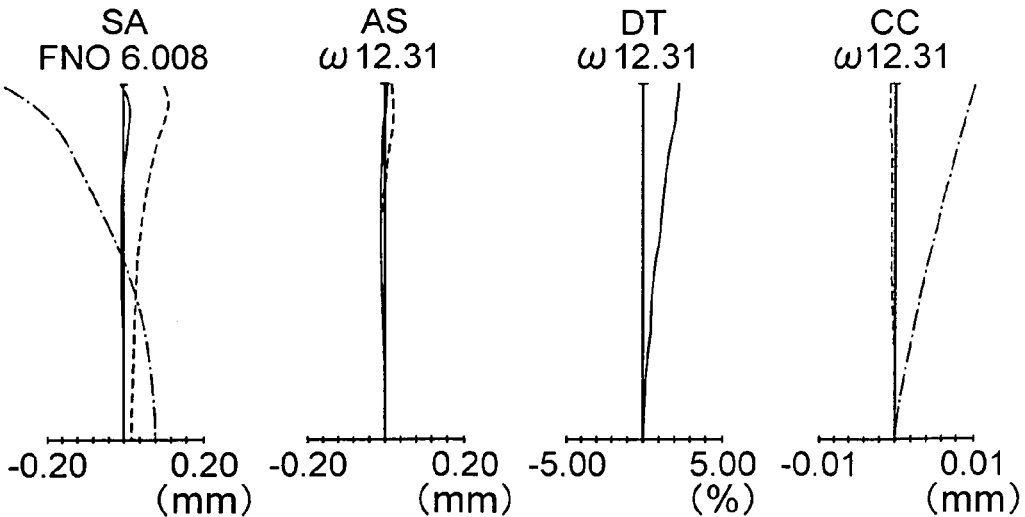
Figure 15A:
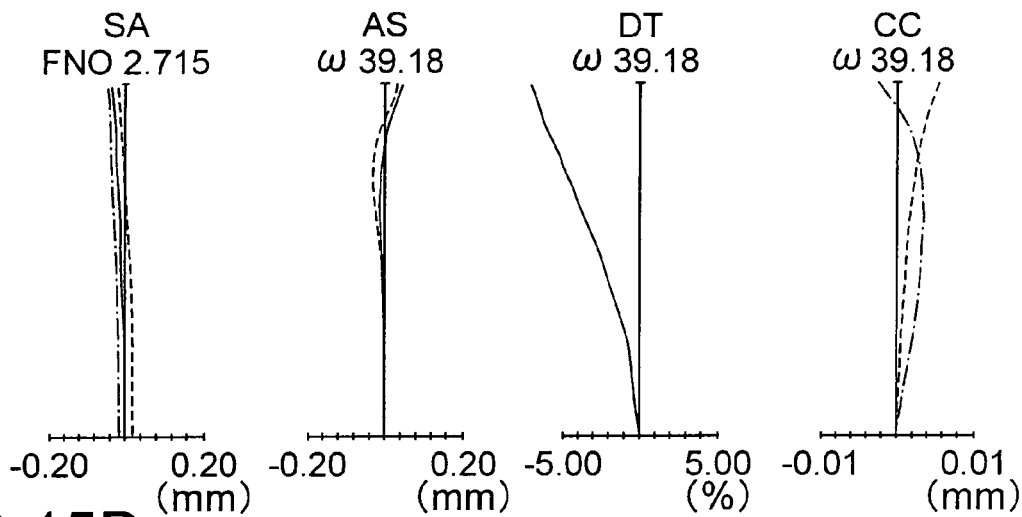
FIGS. 15A, 15B, and 15C are diagrams similar to FIGS. 9A, 9B, and 9C showing aberrations of the zoom lens according to the seventh embodiment in the state in which the zoom lens is focused on an object point at infinity.
Figure 15B:
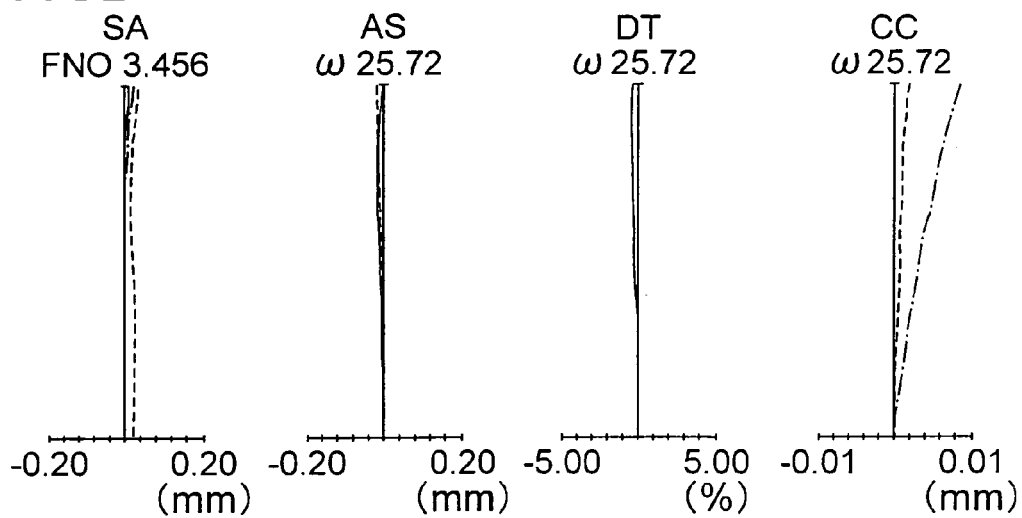
Figure 15C:
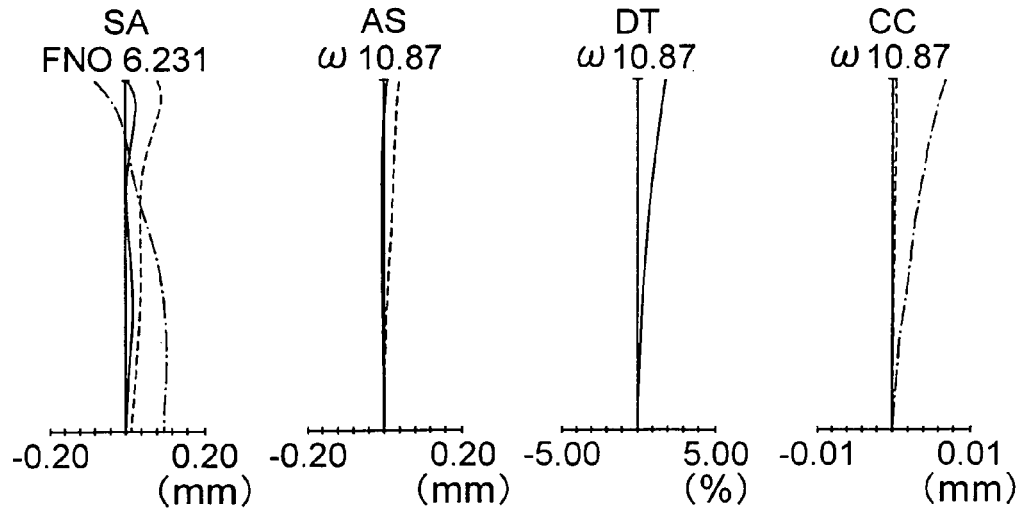
Figure 16A:
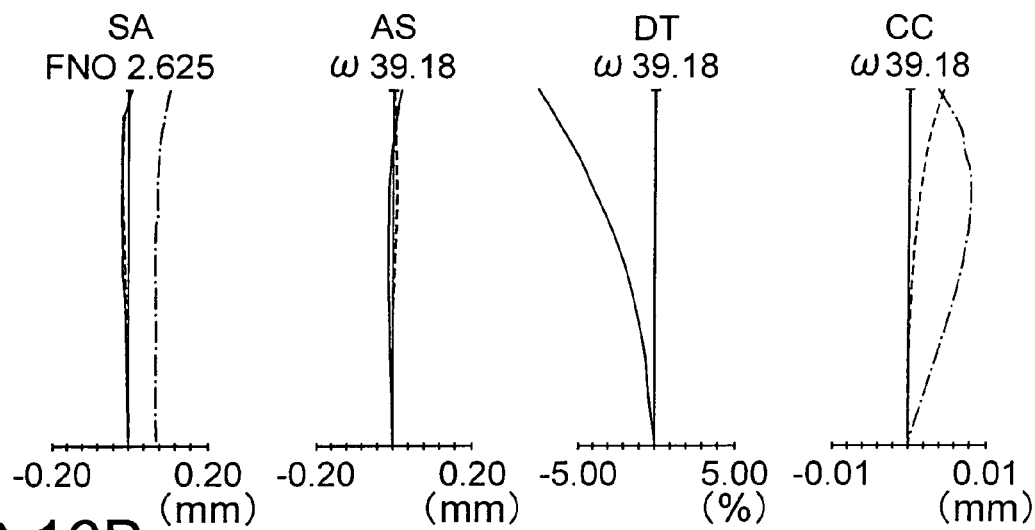
FIGS. 16A, 16B, and 16C are diagrams similar to FIGS. 9A, 9B, and 9C showing aberrations of the zoom lens according to the eighth embodiment in the state in which the zoom lens is focused on an object point at infinity.
Figure 16B:
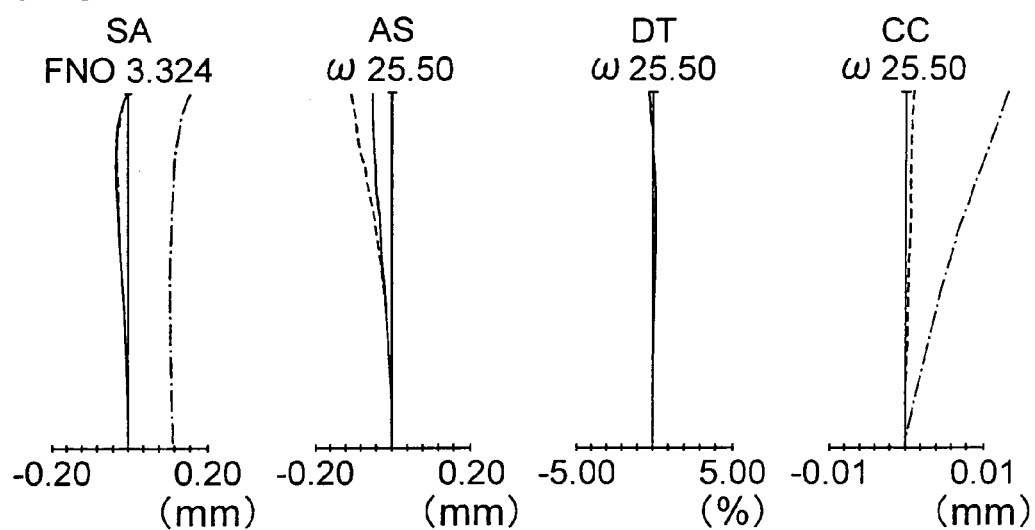
Figure 16C:
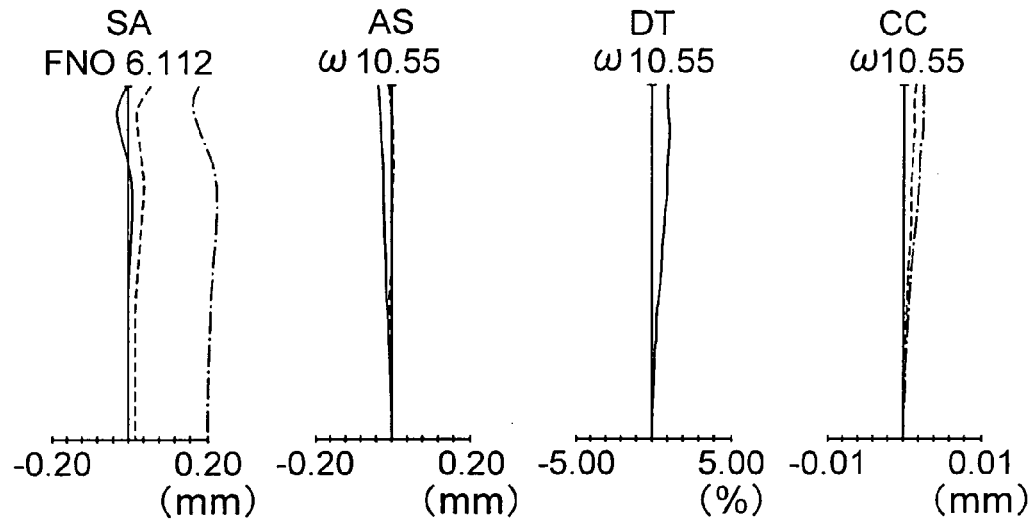

As shown in FIGS. 8A to 8C, the zoom lens according to the eighth embodiment includes, in order from the object side thereof, a first lens unit G1 having a negative refracting power, an aperture stop S, a second lens unit G2 having a positive refracting power, a third lens unit G3 having a negative refracting power, and a fourth lens unit G4 having a positive refracting power.

During zooming from the wide angle end to the telephoto end, the first lens unit G1 first moves toward the image side and thereafter moves toward the object side, the second lens unit G2 moves only toward the object side, the third lens unit G3 moves only toward the object side, and the fourth lens unit G4 moves only toward the image side.

The first lens unit G1 is composed of a biconcave negative lens and a positive meniscus lens having a convex surface directed toward the object side. The second lens unit G2 is composed of a biconvex positive lens and a negative meniscus lens having a convex surface directed toward the object side. The third lens unit G3 is composed of a negative meniscus lens having a convex surface directed toward the object side. The fourth lens unit G4 is composed of a negative meniscus lens (which is a resin lens) having a convex surface directed toward the image side and a positive meniscus lens (which is a resin lens) having a convex surface directed toward the image side. All the lens elements in each lens unit G1, G2, G3, G4 are arranged in the mentioned order from the object side.

The following seven lens surfaces are aspheric surfaces: both surfaces of the biconcave negative lens in the first lens unit G1, both surfaces of the biconvex positive lens in the second lens unit G2, the image side surface of the negative meniscus lens having a convex surface directed toward the object side in the second lens unit G2, the image side surface of the negative meniscus lens having a convex surface directed toward the object side in the third lens unit G3, and the image side surface of the positive meniscus lens having a convex surface directed toward the image side in the fourth lens unit G4.

Numerical data of each embodiment described above is shown below. Apart from symbols described above, f denotes a focal length of the entire zoom lens system, $F_{NO}$ denotes an F number, $\omega$ denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of υd1, υd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further "*" means that the surface is an aspheric surface, and "S" means that the surface is an aperture stop.

EXAMPLE 1

| unit mm | | | | |
|---|---|---|---|---|
| Surface data | | | | |
| Surface No | r | d | nd | vd |
| 1* | −31.515 | 0.80 | 1.80610 | 40.92 |
| 2* | 7.000 | 2.03 | | |
| 3 | 9.346 | 1.28 | 1.92286 | 18.90 |
| 4 | 16.817 | Variable | | |
| 5(S) | ∞ | 0.50 | | |
| 6* | 4.597 | 1.74 | 1.58313 | 59.38 |
| 7* | −10.331 | 0.10 | | |
| 8 | 7.257 | 1.06 | 1.80400 | 46.57 |
| 9 | 13.104 | 0.50 | 1.80518 | 25.42 |
| 10 | 3.117 | Variable | | |
| 11 | −10.000 | 0.80 | 1.52542 | 55.78 |
| 12 | −15.879 | 0.10 | | |
| 13 | −61.608 | 1.61 | 1.52542 | 55.78 |
| 14* | −7.052 | Variable | | |
| 15 | ∞ | 0.50 | 1.54771 | 62.84 |
| 16 | ∞ | 0.50 | | |
| 17 | ∞ | 0.50 | 1.51633 | 64.14 |
| 18 | ∞ | 0.50 | | |
| Image plane (Image pick up plne) | | | | |

| Aspherical coefficients |
|---|
| 1st surface |
| K = 0.000, A4 = 1.28825e−03, A6 = −2.87635e−05, A8 = 1.43822e−08, A10 = 5.28531e−09 |
| 2nd surface |
| K = 0.968, A4 = 7.51526e−04, A6 = 1.29461e−05, A8 = −2.77211e−06, A10 = −7.88860e−11 |
| 6th surface |
| K = −2.315, A4 = 6.32399e−04, A6 = −7.60844e−05, A8 = −1.44293e−05, A10 = −2.09939e−06 |
| 7th surface |
| K = 0.000, A4 = −3.71450e−04, A6 = −1.28789e−05, A8 = −3.03992e−05 |
| 14th surface |
| K = −3.360, A4 = −3.71759e−04, A6 = 4.76797e−06, A8 = −1.08593e−07 |

| Group focal length | | |
|---|---|---|
| f1 = −11.69 | f2 = 9.00 | f3 = 19.40 |

| | WE | ST | TE |
|---|---|---|---|
| Zoom data | | | |
| IH | 3.6 | 3.6 | 3.6 |
| focal length | 4.75 | 7.51 | 16.62 |
| FNO. | 2.88 | 3.53 | 5.85 |
| 2ω(°) | 78.82 | 51.47 | 23.93 |
| BF(in air) | 5.23 | 5.29 | 4.15 |
| Total length(in air) | 31.38 | 27.60 | 30.32 |
| d4 | 13.33 | 6.87 | 1.20 |
| d10 | 2.30 | 4.92 | 14.45 |
| d14 | 3.58 | 3.64 | 2.50 |

-continued

| unit mm | | | |
|---|---|---|---|
| Zoom data (When distortion is electrically corrected) | | | |
| focal length | 4.75 | 7.51 | 16.62 |
| FNO. | 2.88 | 3.53 | 5.85 |
| 2ω(°) | 77.16 | 51.47 | 23.93 |
| IH | 3.51 | 3.6 | 3.6 |

EXAMPLE 2

| unit mm | | | | |
|---|---|---|---|---|
| Surface data | | | | |
| Surface No | r | d | nd | νd |
| 1* | −28.624 | 0.80 | 1.80610 | 40.92 |
| 2* | 7.102 | 1.51 | | |
| 3 | 8.465 | 1.25 | 1.92286 | 18.90 |
| 4 | 15.000 | Variable | | |
| 5 (S) | ∞ | 0.50 | | |
| 6* | 4.584 | 1.68 | 1.58313 | 59.38 |
| 7* | −15.102 | 0.10 | | |
| 8 | 6.386 | 1.20 | 1.80610 | 40.92 |
| 9 | 22.010 | 0.50 | 1.80518 | 25.42 |
| 10 | 3.040 | Variable | | |
| 11* | −13.000 | 0.80 | 1.52542 | 55.78 |
| 12 | −12.693 | 0.10 | | |
| 13 | −23.585 | 2.02 | 1.52542 | 55.78 |
| 14* | −6.191 | Variable | | |
| 15 | ∞ | 0.50 | 1.54771 | 62.84 |
| 16 | ∞ | 0.50 | | |
| 17 | ∞ | 0.50 | 1.51633 | 64.14 |
| 18 | ∞ | 0.32 | | |
| Image plane (Image pick up plane) | | | | |

Aspherical coefficients

1st surface

K = 0.000, A4 = 9.65210e−04, A6 = −1.84232e−05, A8 = 1.54796e−07
2nd surface

K = 0.775, A4 = 6.83359e−04, A6 = −1.28637e−05, A8 = 2.06468e−07,
A10 = −3.45662e−08
6th surface K = −1.904, A4 = 1.02323e−03, A6 = 5.25597e−07, A8 = −4.66818e−06,
A10 = −7.03594e−08
7th surface K = 0.000, A4 = 2.16799e−04, A6 = 2.80625e−05, A8 = −7.06696e−06
11th surface K = 0.000, A4 = −1.21144e−03, A6 = 4.31564e−05
14th surface K = −1.253, A4 = −7.50374e−04, A6 = 2.86564e−05,
A8 = −3.30381e−09

| Group focal length | | |
|---|---|---|
| f1 = −11.75 | f2 = 9.13 | f3 = 14.68 |
| WE | ST | TE |

| Zoom data | | | |
|---|---|---|---|
| IH | 3.6 | 3.6 | 3.6 |
| focal length | 5.08 | 8.03 | 19.71 |
| FNO. | 2.69 | 3.49 | 6.22 |
| 2ω (°) | 78.29 | 51.65 | 21.69 |
| BF (in air) | 4.90 | 4.11 | 3.97 |
| Total length (in air) | 30.11 | 28.53 | 34.15 |
| d4 | 12.17 | 7.34 | 1.30 |
| d10 | 2.60 | 6.63 | 18.43 |
| d14 | 3.43 | 2.64 | 2.50 |
| Zoom data (When distortion is electrically corrected) | | | |
| focal length | 5.08 | 8.03 | 19.71 |
| FNO. | 2.69 | 3.49 | 6.22 |
| 2ω (°) | 77.16 | 51.65 | 21.69 |
| IH | 3.53 | 3.6 | 3.6 |

EXAMPLE 3

| unit mm | | | | |
|---|---|---|---|---|
| Surface data | | | | |
| Surface No | r | d | nd | νd |
| 1* | −57.999 | 0.80 | 1.85135 | 40.10 |
| 2* | 6.200 | 2.50 | | |
| 3* | 11.815 | 1.19 | 2.10225 | 16.80 |
| 4 | 18.266 | Variable | | |
| 5 (S) | ∞ | 0.00 | | |
| 6* | 4.296 | 2.27 | 1.54969 | 71.75 |
| 7* | −9.050 | 0.10 | | |
| 8 | 5.495 | 1.35 | 1.92286 | 20.88 |
| 9 | 2.856 | Variable | | |
| 10 | −10.000 | 0.80 | 1.52542 | 55.78 |
| 11 | −11.124 | 0.16 | | |
| 12 | −15.000 | 1.68 | 1.58313 | 59.38 |
| 13* | −5.592 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image plane (Image pick up plane) | | | | |

Aspherical coefficients

1st surface

K = 0.000, A4 = 1.48620e−03, A6 = −3.26084e−05, A8 = −1.55682e−07,
A10 = 7.46342e−09
2nd surface K = 0.392, A4 = 1.55710e−03, A6 = 1.17426e−05, A8 = −2.92295e−07,
A10 = −1.27276e−07
3rd surface K = 0.000, A4 = 2.81277e−04, A6 = 2.02191e−07, A8 = 0.000,
A10 = 2.1004e−08, A12 = 2.0141e−09, A10 = A14 = −1.39554e−10
6th surface K = −2.195, A4 = 1.00603e−03, A6 = −1.08685e−04, A8 = 1.06757e−06,
A10 = −1.49012e−06
7th surface K = 0.000, A4 = 1.64463e−04, A6 = −4.05406e−05, A8 = −1.34042e−05
13th surface K = −1.481, A4 = 1.97334e−04, A6 = −1.36749e−05, A8 = 1.20016e−07

| Group focal length | | |
|---|---|---|
| f1 = −9.27 | f2 = 8.04 | f3 = 14.68 |
| WE | ST | TE |

-continued unit mm

Zoom data

| | | | |
|---|---|---|---|
| IH | 3.85 | 3.85 | 3.85 |
| focal length | 4.07 | 6.43 | 14.25 |
| FNO. | 2.96 | 3.68 | 6.17 |
| 2ω (°) | 87.82 | 58.31 | 27.79 |
| BF (in air) | 4.39 | 4.50 | 4.15 |
| Total length (in air) | 29.18 | 26.52 | 30.31 |
| d4 | 11.65 | 6.36 | 1.60 |
| d9 | 2.30 | 4.83 | 13.74 |
| d13 | 2.74 | 2.85 | 2.49 |

Zoom data (When distortion is electrically corrected)

| | | | |
|---|---|---|---|
| focal length | 4.07 | 6.43 | 14.25 |
| FNO. | 2.96 | 3.68 | 6.17 |
| 2ω (°) | 85.92 | 58.31 | 27.79 |
| IH | 3.75 | 3.85 | 3.85 |

EXAMPLE 4 unit mm

Surface data

| Surface No | r | d | nd | νd |
|---|---|---|---|---|
| 1* | −40.267 | 0.75 | 1.80610 | 40.92 |
| 2* | 6.106 | 1.88 | | |
| 3 | 8.717 | 1.35 | 1.92286 | 18.90 |
| 4 | 16.000 | Variable | | |
| 5 (S) | ∞ | 0.00 | | |
| 6* | 3.893 | 1.77 | 1.55606 | 64.53 |
| 7* | −21.375 | 0.10 | | |
| 8 | 6.044 | 1.50 | 2.10225 | 16.80 |
| 9* | 3.352 | Variable | | |
| 10* | −10.000 | 0.80 | 1.52542 | 55.78 |
| 11 | −12.572 | 0.10 | | |
| 12 | −34.726 | 1.57 | 1.52542 | 55.78 |
| 13* | −7.254 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image plane (Image pick up plane) | | | | |

Aspherical coefficients

1st surface

K = 0.000, A4 = 9.53870e−04 A6 = −1.82491e−05, A8 = 9.03444e−09, A10 = 2.97648e−09
2nd surface K = 0.480, A4 = 4.91521e−04, A6 = −3.93247e−06, A8 = −7.50240e−07, A10 = −4.68586e−08
6th surface K = −1.448, A4 = 1.68446e−03, A6 = 5.28303e−06, A8 = −1.50101e−05, A10 = 1.40900e−06
7th surface K = 0.000, A4 = −7.33600e−04, A6 = 1.21720e−05, A8 = 1.45238e−06
9th surface K = 0.000, A4 = 3.00679e−03, A6 = 3.47555e−04
10th surface K = 0.000, A4 = −3.33530e−04, A6 = 5.44978e−05
13th surface K = −0.522, A4 = 8.89558e−05, A6 = 3.35121e−05, A8 = 2.97775e−07

-continued unit mm

Group focal length

| | | |
|---|---|---|
| f1 = −10.95 | f2 = 8.46 | f3 = 19.53 |

| | WE | ST | TE |
|---|---|---|---|

Zoom data

| | | | |
|---|---|---|---|
| IH | 3.6 | 3.6 | 3.6 |
| focal length | 4.75 | 7.51 | 16.63 |
| FNO. | 2.96 | 3.72 | 6.16 |
| 2ω (°) | 78.16 | 51.71 | 24.00 |
| BF (in air) | 4.89 | 4.45 | 4.15 |
| Total length (in air) | 29.60 | 26.79 | 29.65 |
| d4 | 12.60 | 7.11 | 1.60 |
| d9 | 2.30 | 5.41 | 14.09 |
| d13 | 3.24 | 2.80 | 2.50 |

Zoom data (When distortion is electrically corrected)

| | | | |
|---|---|---|---|
| focal length | 4.75 | 7.51 | 16.63 |
| FNO. | 2.96 | 3.72 | 6.16 |
| 2ω (°) | 77.17 | 51.71 | 24.00 |
| IH | 3.54 | 3.6 | 3.6 |

EXAMPLE 5 unit mm

Surface data

| Surface No | r | d | nd | νd |
|---|---|---|---|---|
| 1 | 363.766 | 0.75 | 1.80610 | 40.92 |
| 2* | 6.000 | 2.04 | | |
| 3 | 8.428 | 1.28 | 1.92286 | 18.90 |
| 4 | 13.000 | Variable | | |
| 5 (S) | ∞ | 0.00 | | |
| 6* | 4.091 | 1.54 | 1.58313 | 59.38 |
| 7* | −13.846 | 0.10 | | |
| 8 | 5.213 | 1.34 | 1.92286 | 18.90 |
| 9 | 2.640 | Variable | | |
| 10 | −9.034 | 0.80 | 1.52542 | 55.78 |
| 11 | −11.000 | 0.10 | | |
| 12 | −28.356 | 1.69 | 1.52542 | 55.78 |
| 13* | −6.084 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image palne (Image pick up plane) | | | | |

Aspherical coefficients

2nd surface

K = −0.312, A4 = −9.90285e−05, A6 = −3.85629e−06, A8 = 7.70198e−08, A10 = −3.18495e−09
6th surface K = −1.917, A4 = 7.66948e−04, A6 = −1.21977e−04, A8 = −1.62327e−05, A10 = −6.92312e−06
7th surface K = 0.000, A4 = −9.09506e−04, A6 = −1.35015e−05, A8 = −6.43215e−05
13th surface K = −3.163, A4 = −6.05348e−04, A6 = 7.34462e−06, A8 = −1.16607e−07

-continued unit mm

Group focal length

| f1 = −12.07 | f2 = 8.82 | f3 = 15.70 |
|---|---|---|

| | WE | ST | TE |
|---|---|---|---|
| Zoom data | | | |
| IH | 3.6 | 3.6 | 3.6 |
| focal length | 4.75 | 7.50 | 16.61 |
| FNO. | 2.89 | 3.66 | 5.99 |
| 2ω (°) | 78.98 | 51.17 | 23.94 |
| BF (in air) | 4.88 | 4.30 | 4.15 |
| Total length (in air) | 30.15 | 27.23 | 29.51 |
| d4 | 13.33 | 7.67 | 1.60 |
| d9 | 2.30 | 5.62 | 14.12 |
| d13 | 3.23 | 2.65 | 2.50 |
| Zoom data (When distortion is electrically corrected) | | | |
| focal length | 4.75 | 7.51 | 16.63 |
| FNO. | 2.96 | 3.72 | 6.16 |
| 2ω (°) | 77.20 | 51.71 | 24.00 |
| IH | 3.50 | 3.6 | 3.6 |

EXAMPLE 6 unit mm

Surface data

| Surface No | r | d | nd | vd |
|---|---|---|---|---|
| 1* | −101.960 | 0.80 | 1.80610 | 40.92 |
| 2* | 6.026 | 2.24 | | |
| 3 | 7.927 | 1.25 | 1.92286 | 18.90 |
| 4 | 11.714 | Variable | | |
| 5 (S) | ∞ | 0.00 | | |
| 6* | 4.320 | 1.61 | 1.58313 | 59.38 |
| 7* | −11.280 | 0.10 | | |
| 8 | 5.926 | 1.50 | 1.92286 | 18.90 |
| 9 | 2.876 | Variable | | |
| 10 | −10.000 | 0.80 | 1.49700 | 81.61 |
| 11 | −11.321 | 0.10 | | |
| 12 | −44.614 | 1.56 | 1.49700 | 81.61 |
| 13* | −7.436 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image plane (Image pick up plane) | | | | |

Aspherical coefficients

1st surface

K = 0.000, A4 = 9.19304e−04, A6 = −1.59914e−05, A8 = −2.00653e−07, A10 = 7.26801e−09
2nd surface K = 0.576, A4 = 4.20396e−04, A6 = 1.23717e−05, A8 = −1.88963e−06, A10 = −4.69727e−08
6th surface K = −2.144, A4 = 8.73053e−04, A6 = −4.28150e−05, A8 = −1.50232e−05, A10 = −2.57889e−06
7th surface K = 0.000, A4 = −3.19558e−04, A6 = 5.83092e−05, A8 = −3.97480e−05
13th surface K = −6.150, A4 = −1.04910e−03, A6 = 4.05974e−05, A8 = −8.82329e−07

-continued unit mm

Group focal length

| f1 = −10.90 | f2 = 8.47 | f3 = 18.63 |
|---|---|---|

| | WE | ST | TE |
|---|---|---|---|
| Zoom data | | | |
| IH | 3.6 | 3.6 | 3.6 |
| focal length | 4.61 | 7.29 | 16.14 |
| FNO. | 2.89 | 3.60 | 6.01 |
| 2ω (°) | 80.24 | 52.78 | 24.62 |
| BF (in air) | 4.74 | 4.74 | 4.15 |
| total length (in air) | 29.73 | 26.56 | 29.68 |
| d4 | 12.71 | 6.91 | 1.60 |
| d9 | 2.30 | 4.94 | 13.95 |
| d13 | 3.09 | 3.08 | 2.50 |
| Zoom data (When distortion is electrically corrected) | | | |
| focal length | 4.75 | 7.51 | 16.63 |
| FNO. | 2.96 | 3.72 | 6.16 |
| 2ω (°) | 78.83 | 51.71 | 24.00 |
| IH | 3.52 | 3.6 | 3.6 |

EXAMPLE 7 unit mm

Surface data

| Surface No | r | d | nd | vd |
|---|---|---|---|---|
| 1* | −58.855 | 0.80 | 1.80610 | 40.92 |
| 2* | 6.277 | 2.16 | | |
| 3 | 9.471 | 1.17 | 1.92286 | 18.90 |
| 4 | 17.000 | Variable | | |
| 5 (S) | ∞ | 0.60 | | |
| 6* | 4.351 | 1.82 | 1.58313 | 59.38 |
| 7* | −20.893 | 0.10 | | |
| 8 | 7.239 | 1.49 | 1.81600 | 46.62 |
| 9 | −9.912 | 0.51 | 1.90366 | 31.31 |
| 10* | 3.664 | Variable | | |
| 11* | −13.918 | 0.80 | 1.52542 | 55.78 |
| 12 | −14.157 | 0.10 | | |
| 13 | −28.285 | 1.75 | 1.52542 | 55.78 |
| 14* | −7.381 | Variable | | |
| 15 | ∞ | 0.50 | 1.54771 | 62.84 |
| 16 | ∞ | 0.50 | | |
| 17 | ∞ | 0.50 | 1.51633 | 64.14 |
| 18 | ∞ | 0.32 | | |
| Image plane (Image pick up plane) | | | | |

Aspherical coefficients

1st surface

K = 0.000, A4 = 4.44012e−04, A6 = −6.81498e−06, A8 = 5.22166e−08
2nd surface

K = −1.079, A4 = 7.59676e−04, A6 = 3.19513e−06
6th surface

K = −1.617, A4 = 1.55861e−03, A6 = −3.53530e−06
7th surface

K = 0.000, A4 = −8.59697e−05, A6 = 3.53598e−05, A8 = −1.81923e−06
10th surface

K = 0.000, A4 = 2.43339e−03, A6 = 9.59757e−05, A8 = 3.89963e−05
11th surface

K = 0.000, A4 = −4.22139e−04, A6 = 1.92221e−05

-continued unit mm

14th surface

K = −1.578, A4 = −1.73317e−04, A6 = 8.80572e−06, A8 = 7.74930e−08

Zoom data

|  | WE | ST | TE |
|---|---|---|---|
| IH | 3.6 | 3.6 | 3.6 |
| focal length | 5.08 | 8.03 | 19.71 |
| FNO. | 2.71 | 3.46 | 6.23 |
| 2ω (°) | 78.36 | 51.44 | 21.73 |
| BF (in air) | 4.94 | 4.42 | 3.97 |
| total length (in air) | 31.86 | 29.41 | 34.65 |
| d4 | 13.00 | 7.46 | 1.30 |
| d10 | 2.60 | 6.23 | 18.07 |
| d14 | 3.47 | 2.94 | 2.50 |

Group focal length

| f1 = −11.54 | f2 = 9.26 | f3 = 18.09 |
|---|---|---|

Zoom data (When distortion is electrically corrected)

|  | WE | ST | TE |
|---|---|---|---|
| focal length | 4.75 | 7.51 | 16.63 |
| FNO. | 2.96 | 3.72 | 6.16 |
| 2ω (°) | 77.16 | 51.71 | 24.00 |
| IH | 3.52 | 3.6 | 3.6 |

EXAMPLE 8 unit mm

Surface data

| Surface No | r | d | nd | vd |
|---|---|---|---|---|
| 1* | −170.588 | 0.80 | 1.80610 | 40.92 |
| 2* | 5.417 | 2.50 |  |  |
| 3 | 11.124 | 1.17 | 1.94595 | 17.98 |
| 4 | 26.213 | Variable |  |  |
| 5 (S) | ∞ | 0.30 |  |  |
| 6* | 4.583 | 1.86 | 1.59201 | 67.02 |
| 7* | −23.511 | 0.10 |  |  |
| 8 | 7.514 | 1.42 | 2.10225 | 16.80 |
| 9* | 4.164 | Variable |  |  |
| 10 | 36.252 | 1.00 | 1.68893 | 31.07 |
| 11* | 33.205 | Variable |  |  |
| 12 | −20.000 | 0.80 | 1.52542 | 55.78 |
| 13 | −23.250 | 0.10 |  |  |
| 14 | −100.000 | 1.68 | 1.52542 | 55.78 |
| 15* | −9.013 | Variable |  |  |
| 16 | ∞ | 0.50 | 1.54771 | 62.84 |
| 17 | ∞ | 0.50 |  |  |
| 18 | ∞ | 0.50 | 1.51633 | 64.14 |
| 19 | ∞ | 0.32 |  |  |
| 20 | ∞ |  |  |  |
| Image plane (Image pick up plane) |  |  |  |  |

Aspherical coefficients

1st surface

K = 0.000, A4 = 1.63940e−04, A6 = −1.77404e−06, A8 = 1.10850e−08

2nd surface

K = −1.104, A4 = 4.71310e−04, A6 = 4.05687e−06

-continued unit mm

6th surface

K = −1.640, A4 = 1.57660e−03, A6 = −8.51162e−06

7th surface

K = 0.000, A4 = 2.75909e−04, A6 = −1.55051e−05, A8 = 1.07061e−06

9th surface

K = 0.401, A4 = 4.74056e−04, A6 = 7.93782e−05

11th surface

K = 0.000, A4 = 3.16241e−04, A6 = 2.13256e−05

15th surface

K = −1.481, A4 = 3.76868e−04, A6 = −1.35515e−05, A8 = 1.26799e−07

Group focal length

| f1 = −11.53 | f3 = 9.90 | f3 = −662.08 | f4 = 19.61 |
|---|---|---|---|

|  | WE | ST | TE |
|---|---|---|---|

Zoom data

|  | WE | ST | TE |
|---|---|---|---|
| focal length | 5.08 | 8.03 | 20.32 |
| FNO. | 2.62 | 3.32 | 6.11 |
| 2ω (°) | 78.35 | 51.00 | 21.09 |
| IH | 3.82 | 3.82 | 3.82 |
| BF | 4.91 | 4.31 | 3.47 |
| total length | 33.53 | 30.86 | 36.54 |
| d4 | 13.39 | 7.44 | 0.80 |
| d9 | 1.50 | 3.30 | 5.00 |
| d11 | 2.00 | 4.08 | 15.54 |
| d15 | 3.44 | 2.84 | 2.00 |
| d20 | −0.00 | −0.00 | −0.00 |

Zoom data (When distortion is electrically corrected)

|  | WE | ST | TE |
|---|---|---|---|
| focal length | 5.08 | 8.03 | 20.32 |
| FNO. | 2.62 | 3.32 | 6.11 |
| 2ω (°) | 73.88 | 51.00 | 21.09 |
| IH | 3.71 | 3.82 | 3.82 |

FIGS. 9A, 9B, and 9C to 16A, 16B, and 16C are aberration diagrams of the zoom lenses according to the first to the eighth embodiments respectively in the state in which the zoom lenses are focused on an object point at infinity. These aberration diagrams show spherical aberration (SA), astigmatism (AS), distortion (DT), and chromatic aberration of magnification (CC) respectively at the wide angle end in FIGS. 9A to 16A, in the intermediate focal length state in FIGS. 9B to 16B, and at the telephoto end in FIGS. 9C to 16C. The sign "ω" in these diagrams represents half angle of field.

Conditional values (1)-(11) of each of the embodiments are shown below:

|  | Example 1 | Example 2 | Example 3 | Example 4 |
|---|---|---|---|---|
| (1) $f_T/f_{IF}$ | −0.3597 | 0.027231 | −0.05883 | −0.18744 |
| (2) $(R_{IFR} + R_{IRF})/(R_{IFR} − R_{IRF})$ | −1.69447 | −3.3308 | −6.73898 | −2.13502 |
| (3) $D_M/D_I$ | −10.25 | −16.0215 | −44.76 | −14.9324 |
| (4) $(R_{IRF} + R_{IRR})/(R_{IRF} − R_{IRR})$ | 1.258504 | 1.711769 | 2.188748 | 1.528111 |
| (5) $f_{IFF}/f_{IFR}$ | −1.02415 | −0.62977 | −0.899 | −0.7954 |
| (6) $D_{OM}/f_W$ | 2.49317 | 2.911911 | 2.862238 | 2.652638 |
| (7) $n_{Iave}$ | 1.52542 | 1.52542 | 1.554275 | 1.52542 |
| (8) $v_{Iave}$ | 55.7771 | 55.7771 | 57.57855 | 55.7771 |
| (10) $f_T/f_W$ | 3.5 | 3.88 | 3.5 | 3.5 |
| (11) $(f_W \cdot \tan\omega_{07W})$ | 0.942645 | 0.930925 | 0.960465 | 0.951067 |
|  | Example 5 | Example 6 | Example 7 | Example 8 |
| (1) $f_T/f_{IF}$ | −0.14032 | −0.08632 | 0.001763 | −0.065915 |
| (2) $(R_{IFR} + R_{IRF})/(R_{IFR} − R_{IRF})$ | −2.2676 | −1.68013 | 3.00393 | −1.605867 |
| (3) $D_M/D_I$ | −15.1918 | −18.7458 | −14.9485 | −10.866 |
| (4) $(R_{IRF} + R_{IRR})/(R_{IRF} − R_{IRR})$ | 1.546348 | 1.400035 | 1.70614 | 1.1981058 |
| (5) $f_{IFF}/f_{IFR}$ | −1.48493 | −0.88328 | −0.98317 | −1.1625063 |
| (6) $D_{OM}/f_W$ | 2.807932 | 2.756339 | 2.908675 | 2.6348777 |
| (7) $n_{Iave}$ | 1.52542 | 1.497 | 1.52542 | 1.52542 |
| (8) $v_{Iave}$ | 55.7771 | 81.61 | 55.7771 | 55.7771 |
| (10) $f_T/f_w$ | 3.5 | 3.88 | 3.5 | 3.5 |
| (11) $y_{07}/(f_W \cdot \tan\omega_{07W})$ | 0.961141 | 0.954629 | 0.953373 | 0.9593375 |

(Correction of Distortion)

Incidentally, when the zoom lens system of the present invention is used, a digital correction of distortion of an image is carried out electrically. A basic concept for the digital correction of the distortion of an image will be described below.

Figure 17:
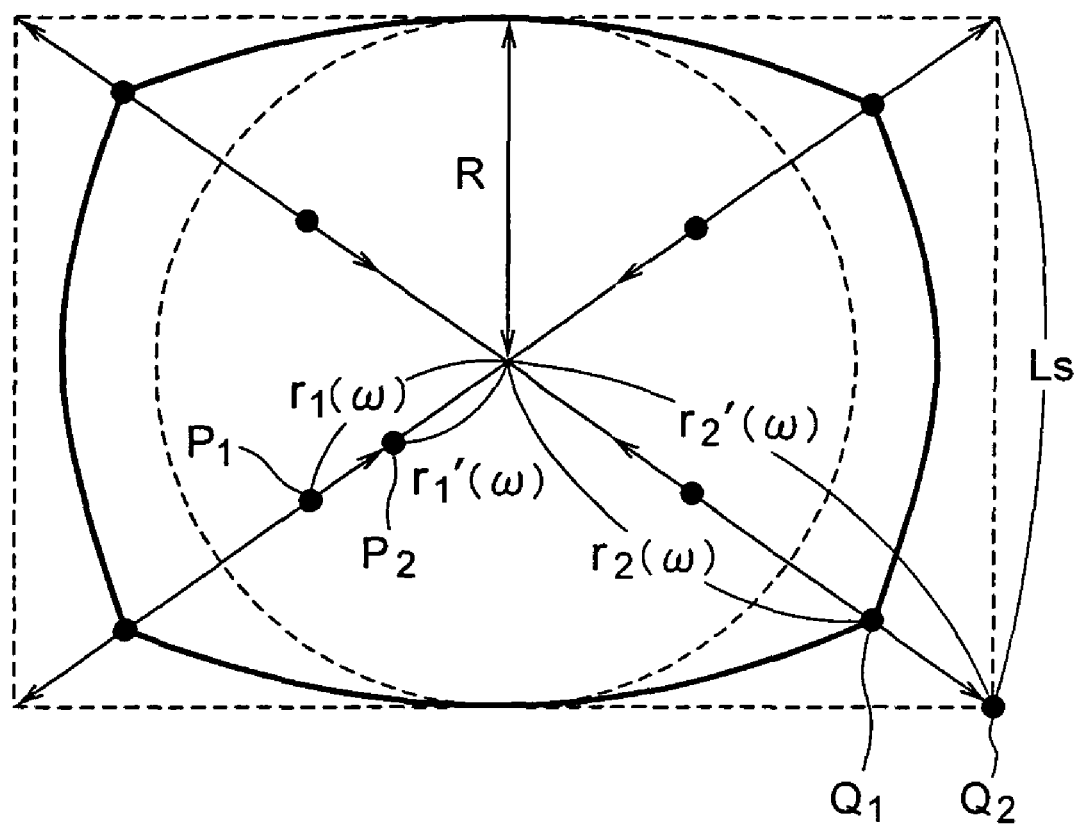
FIG. 17 is a diagram illustrating correction of distortion.

For example, as shown in FIG. 17, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 17, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \tan\omega \quad (0 \leq \alpha \leq 1)$$

where, ω is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan\omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6\ Ls$$

where, Ls is a length of a short side of the effective image pickup surface.

It is preferable that the radius R satisfies the following conditional expression.

$$0.3\ Ls \leq R \leq 0.6\ Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y / \tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y / \tan \omega.$$

In other words, when the focal length f of the imaging system, and the image height y are let to be fixed, a value of ω becomes large.

(Digital Camera)

Figure 18:
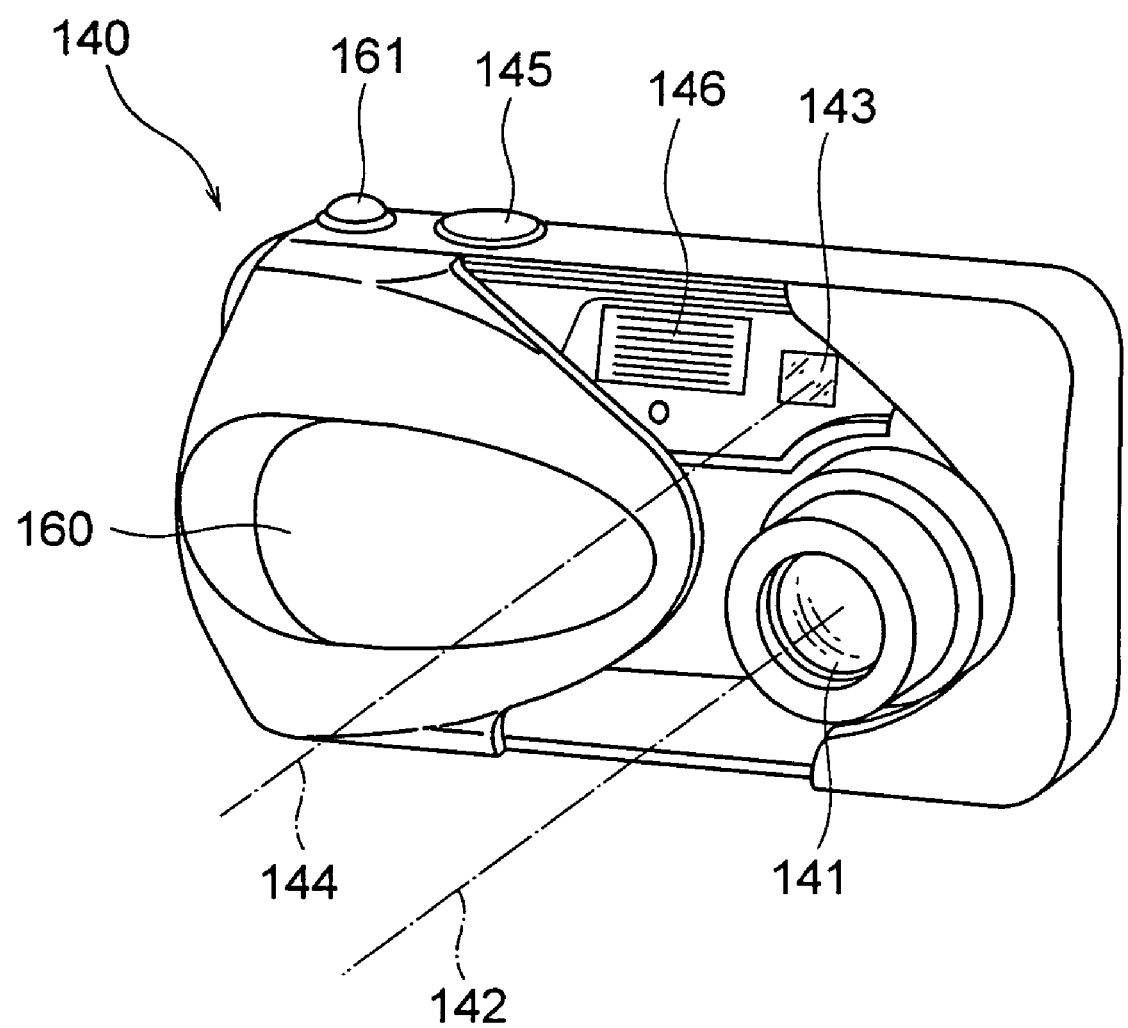
FIG. 18 is a front perspective view showing an outer appearance of a digital camera equipped with a zoom lens according to the present invention.
Figure 19:
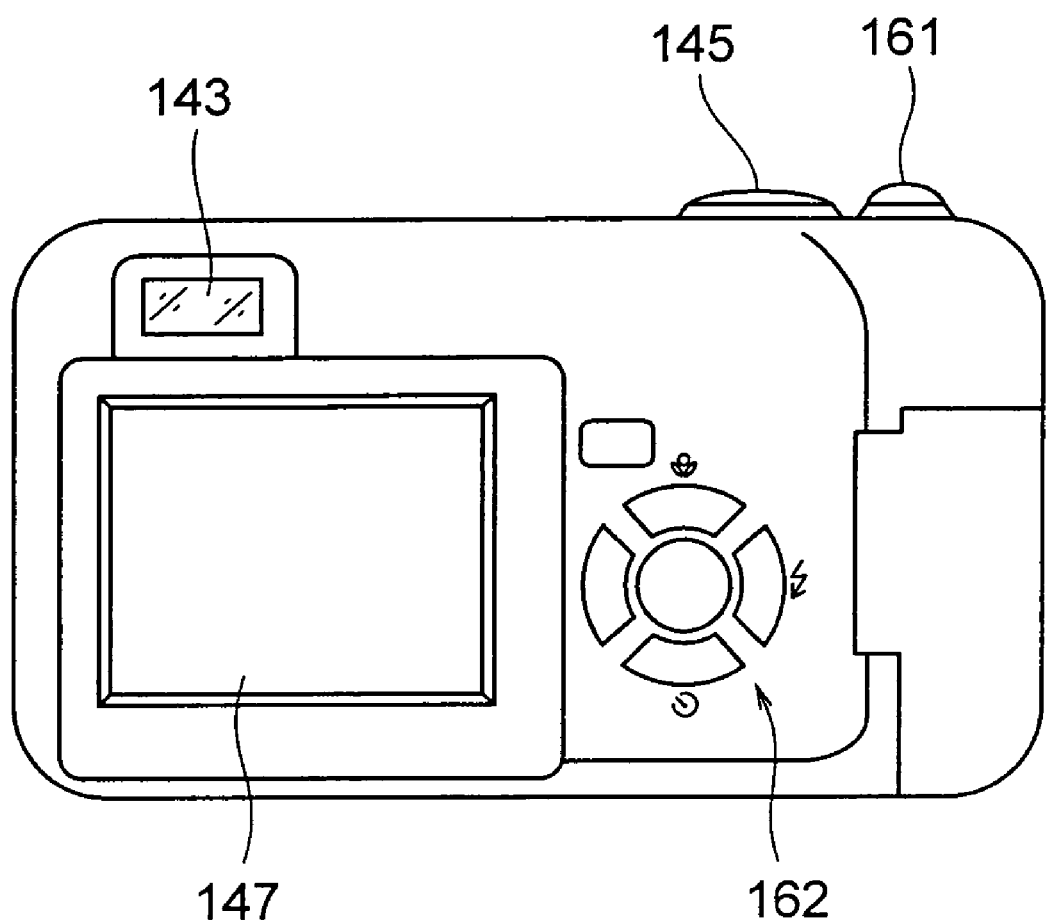
FIG. 19 is a rear view of the digital camera.
Figure 20:
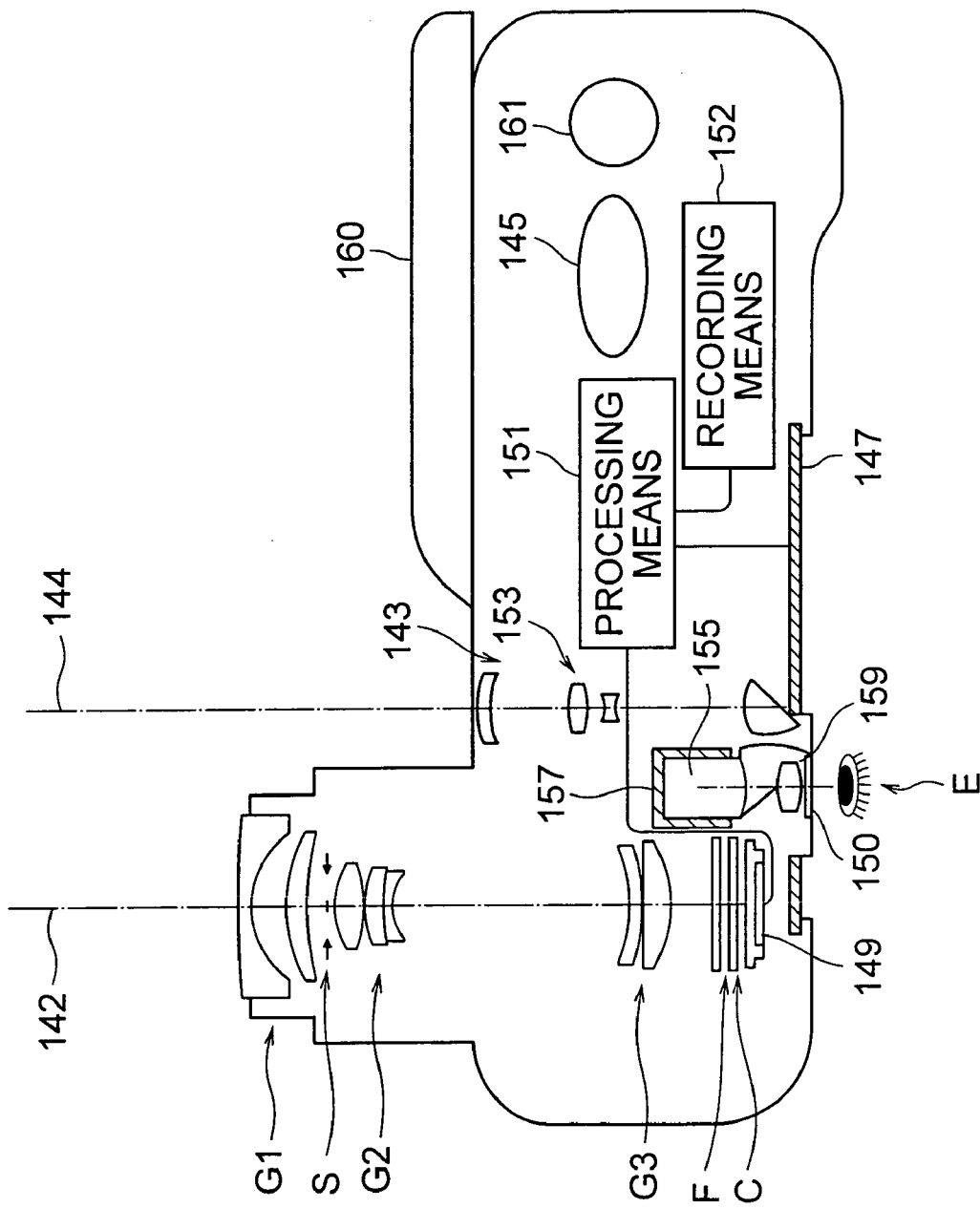
FIG. 20 is a cross sectional view of the digital camera.

FIG. 18 to FIG. 20 are conceptual diagrams of a structure of a digital camera according to the present invention in which a zoom lens system described above is incorporated in a taking optical system 141. FIG. 18 is a front perspective view showing an appearance of a digital camera 140, FIG. 19 is a rear view of the same, and FIG. 20 is a schematic cross-sectional view showing a structure of the digital camera 140. In FIG. 18 and FIG. 20, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 18, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 21:
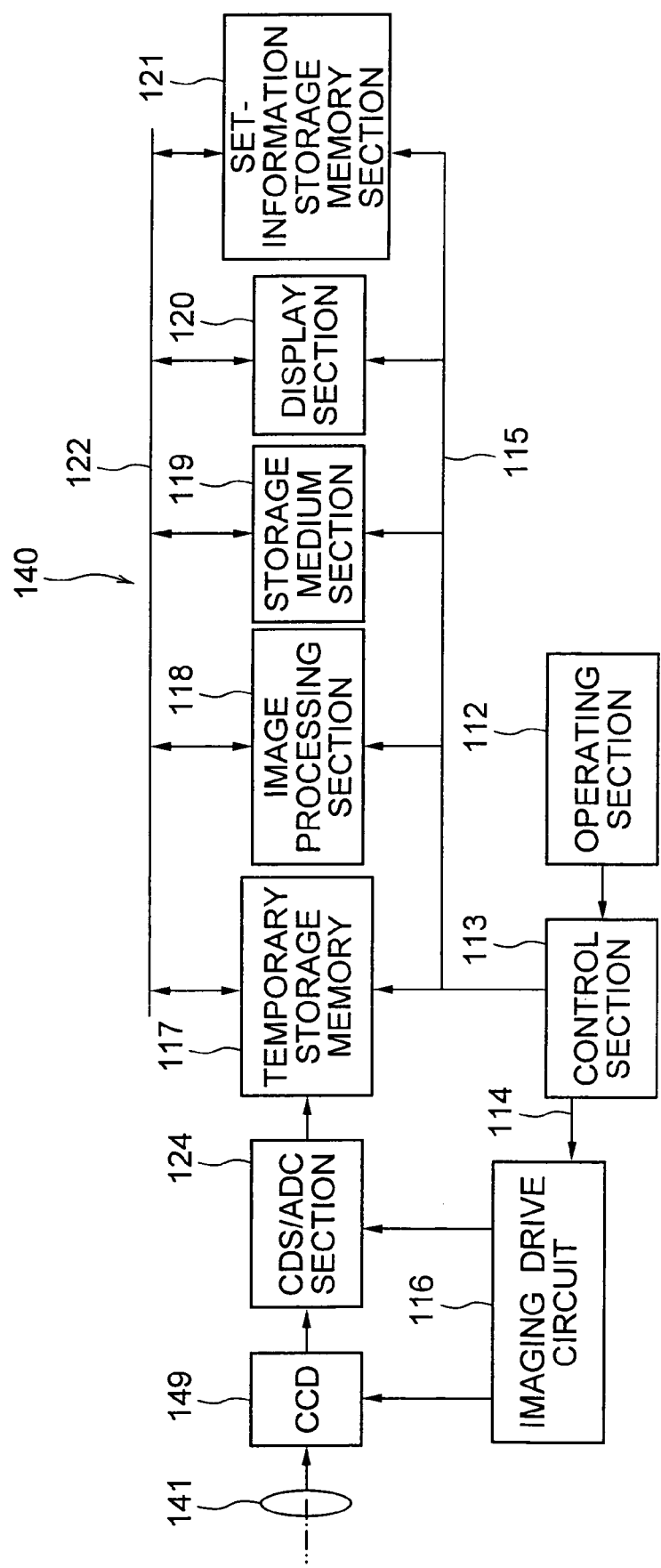
FIG. 21 is a block diagram of an internal circuit of a principal portion of the digital camera.

FIG. 21 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 21, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the zoom lens according to the present invention is suitable for a lens system in which angle of field and zoom ratio are ensured and having a good optical performance.

What is claimed is:

1. A zoom lens comprising:
    an object side lens unit having a negative refracting power disposed closest to the object side,
    an image side lens unit having a positive refracting power disposed closest to the image side,
    an intermediate lens unit having a positive refracting power disposed between the object side lens unit and the image side lens unit, and
    an aperture stop disposed closer to the image side than the object side lens unit and closer to the object side than the image side lens unit, wherein
    a distance between the object side lens unit and the intermediate lens unit is smaller at the telephoto end than at the wide angle end,
    a distance between the intermediate lens unit and the image side lens unit is larger at the telephoto end than at the wide angle end,
    the intermediate lens unit moves in such a way that it is located closer to the object side at the telephoto end than at the wide angle end,
    the image side lens unit moves in such a way that it is located closer to the image side at the telephoto end than at the wide angle end,
    the aperture stop moves integrally with the intermediate lens unit during zooming from the wide angle end to the telephoto end, and
    a lens component is defined as a lens member whose lens surfaces that are in contact with air include only two surfaces, one being an object side lens surface and the other being an image side lens surface,
    the image side lens unit comprises, in order from the object side, a front lens component and a rear lens component having a positive refracting power,
    the front lens component has a meniscus shape with a concave object side lens surface and a convex image side lens surface, the rear lens component has a meniscus shape with a concave object side lens surface and a convex image side lens surface,
    the total number of lens components included in the image side lens unit is two,
    and the absolute value of a paraxial radius of curvature of the convex image side lens surface of the front lens component is smaller than the absolute value of a paraxial radius of curvature of the concave object side lens surface of the rear lens component.

2. The zoom lens according to claim 1, wherein the zoom lens satisfies the following conditions:

$$-0.45 < f_I/f_{IF} < 0.20 \quad (1)$$

$$-10.0 < (R_{IFR}+R_{IRF})/(R_{IFR}-R_{IRF}) < -1.1 \quad (2)$$

$$-90.0 < D_M/D_I < -3.0 \quad (3)$$

where, $f_{IF}$ is a focal length of the front lens component in the image side lens unit, $f_I$ is the focal length of the image side lens unit, $R_{IFR}$ is a paraxial radius of curvature of the convex image side lens surface of the front lens component in the image side lens unit, $R_{IRF}$ is a paraxial radius of curvature of the concave object side lens surface of the rear lens component in the image side lens unit, $D_M$ is a distance between the position of the intermediate lens unit that moves integrally with the aperture stop at the wide angle end and that at the telephoto end, and $D_I$ is a distance between the position of the image side lens unit at the wide angle end and that at the telephoto end, wherein each distance $D_M$, $D_I$ is represented by a positive value if the corresponding lens unit is displaced toward the object side by zooming from the wide angle end to the telephoto end and by a negative value if the corresponding lens unit is displaced toward the image side.

3. The zoom lens according to claim 1, wherein the rear lens component in the image side lens unit satisfies the following condition:

$$1.0 < (R_{IRF}+R_{IRR})/(R_{IRF}-R_{IRR}) < 3.0 \quad (4)$$

where $R_{IRF}$ is a paraxial radius of curvature of the concave object side lens surface of the rear lens component in the image side lens unit, and $R_{IRR}$ is a paraxial radius of curvature of the convex image side lens surface of the rear lens component in the image side lens unit.

4. The zoom lens according to claim 1, wherein the front lens component in the image side lens unit has a meniscus shape that satisfies the following condition:

$$-1.3 < f_{IFF}/f_{IFR} < -0.5 \quad (5)$$

where $f_{IFF}$ is the reciprocal of a refracting power of the concave object side lens surface of the front lens component in the image side lens unit, and $f_{IFR}$ is the reciprocal of a refracting power of the convex image side lens surface of the front lens component in the image side lens unit.

5. The zoom lens according to claim 1, wherein the aperture stop is provided just in front of the intermediate lens unit.

6. The zoom lens according to claim 1, wherein the intermediate lens unit is a lens unit disposed just after the image side of the object side lens unit, and the zoom lens satisfies the following condition at the wide angle end:

$$1 < D_{OM}/f_W < 4 \quad (6)$$

where $D_{om}$ is the distance, on the optical axis, from a lens surface closest to the image side in the object side lens unit to a lens surface closest to the object side in the intermediate lens unit at the wide angle end, and $f_w$ is a focal length of the entire zoom lens system at the wide angle end.

7. The zoom lens according to claim 1, wherein all lens elements in the image side lens unit satisfy the following conditions:

$$n_{Iave} \geq 1.4 \quad (7)$$

$$v_{Iave} \geq 50 \quad (8)$$

where $n_{Iave}$ is the average of reflective indices of all the lens elements in the image side lens unit, and $v_{Iave}$ is the average of Abbe numbers of all the lens elements in the image side lens unit.

8. The zoom lens according to claim 1, wherein the total number of lens elements included in the image side lens unit is two, and either one of these lens units has an aspheric surface.

9. The zoom lens according to claim 1, wherein the rear lens component in the image side lens unit has an aspheric surface.

10. The zoom lens according to claim 1, wherein the image side lens unit includes at least one resin lens element.

11. The zoom lens according to claim 1, wherein the zoom lens satisfies the following conditions:

$$6 \leq N_t \leq 8 \quad (9)$$

where Nt is the total number of lens elements included in the zoom lens.

12. The zoom lens according to claim 1, wherein the lens units in the zoom lens includes only three lens units, or the object side lens unit, the image side lens unit, and the intermediate lens unit.

13. The zoom lens according to claim 1, wherein the zoom lens comprises a lens unit that is provided between the intermediate lens unit and the image side lens unit and moves independently from the intermediate lens unit and the image side lens unit during zooming from the wide angle end to the telephoto end.

14. The zoom lens according to claim 13, wherein the total number of lens units included in the zoom lens is only four.

15. The zoom lens according to claim 1, wherein the object side lens unit moves first toward the image side and thereafter toward the object side during zooming from the wide angle end to the telephoto end.

16. The zoom lens according to claim 1, wherein the zoom ratio of the entire zoom lens system between the wide angle end and telephoto end satisfies the following condition.

$$3.2 < f_T/f_W < 7.0 \quad (10)$$

where $f_T$ is a focal length of the entire zoom lens system at the telephoto end, and $f_W$ is a focal length of the entire zoom lens system at the wide angle end.

17. An image pickup apparatus comprising the zoom lens according to claim 1, and an image pickup element that has an image pickup surface disposed on the image side of the zoom lens and converts an optical image on the image pickup surface formed by the zoom lens into an electrical signal.

18. The image pickup apparatus according to claim 17, wherein the image pickup apparatus is provided with a signal processing circuit that processes image data obtained by picking up an image by the image pickup element and outputs processed image data representing an image having a transformed shape, and the zoom lens satisfies the following condition in a state in which the zoom lens is set to the wide angle end and focused on farthest distance:

$$0.7 < y_{07}/(f_W \tan \omega_{07w}) < 1.0 \quad (11)$$

where $y_{07}$ is defined by equation $y_{07}=0.7 \times y_{10}$, $y_{10}$ being the distance from a center of an effective image pick area of the image pickup element to a point farthest from the center within the effective image pickup area, wherein if the effective image pickup area changes during zooming from the wide angle end to the telephoto end, $y_{10}$ is the maximum value of the aforementioned distance, $\omega_{07w}$ is an angle formed by the optical axis and an incident ray in the object space of a principal ray that is incident on an image position at an image height of $y_{07}$ from the center of the image pickup surface at the wide angle end.

* * * * *